(12) United States Patent
Hahakura et al.

(10) Patent No.: US 9,333,656 B2
(45) Date of Patent: May 10, 2016

(54) ROBOT

(71) Applicant: Seiko Epson Corporation, Tokyo (JP)

(72) Inventors: Seiji Hahakura, Suwa (JP); Takuya Owa, Matsumoto (JP)

(73) Assignee: Seiko Epson Corporation (JP)

( * ) Notice: Subject to any disclaimer, the term of this patent is extended or adjusted under 35 U.S.C. 154(b) by 750 days.

(21) Appl. No.: 13/853,343

(22) Filed: Mar. 29, 2013

(65) Prior Publication Data
US 2013/0255429 A1 Oct. 3, 2013

(30) Foreign Application Priority Data

Apr. 2, 2012 (JP) ................. 2012-084351

(51) Int. Cl.
*B25J 17/00* (2006.01)
*B25J 9/10* (2006.01)
*B25J 19/00* (2006.01)

(52) U.S. Cl.
CPC *B25J 17/00* (2013.01); *B25J 9/108* (2013.01); *B25J 19/0062* (2013.01); *Y10S 901/28* (2013.01); *Y10T 74/20329* (2015.01)

(58) Field of Classification Search
CPC ........ B25J 17/00; B25J 9/108; B25J 19/0062; Y10T 74/20329
See application file for complete search history.

(56) References Cited

U.S. PATENT DOCUMENTS

| 4,717,161 | A  | * | 1/1988 | Stremeckus | F16J 15/56 277/540 |
| 6,053,029 | A  | * | 4/2000 | Nakajima | F16J 15/3296 73/9 |
| 6,212,754 | B1 | * | 4/2001 | Nakajima | B23P 19/084 277/551 |
| 6,223,424 | B1 | * | 5/2001 | Nakajima | B23P 19/084 277/311 |
| 6,226,851 | B1 | * | 5/2001 | Nakajima | B23P 19/084 277/311 |
| 6,234,003 | B1 | * | 5/2001 | Nakajima | F16J 15/3296 73/9 |
| 2005/0211008 | A1 | * | 9/2005 | Goppelsroder | F16H 57/025 74/454 |
| 2006/0208428 | A1 | * | 9/2006 | Oiyama | F16J 15/3216 277/551 |
| 2009/0183510 | A1 | * | 7/2009 | Bielass | F01D 17/145 60/611 |
| 2009/0230630 | A1 | * | 9/2009 | Kondo | F16J 15/3236 277/553 |
| 2010/0320698 | A1 | * | 12/2010 | Shimomura | F16J 15/3228 277/572 |
| 2011/0091143 | A1 | * | 4/2011 | Murphy | F16C 33/74 384/473 |
| 2011/0204579 | A1 | * | 8/2011 | Donovan | F16J 15/3244 277/559 |
| 2011/0241296 | A1 | * | 10/2011 | Ting | F16J 15/3224 277/568 |
| 2012/0085191 | A1 | * | 4/2012 | Long | B25J 17/02 74/423 |

(Continued)

FOREIGN PATENT DOCUMENTS

| JP | 62-061490 U | 4/1987 |
| JP | 2003-083346 A | 3/2003 |

(Continued)

*Primary Examiner* — David M Fenstermacher

(74) *Attorney, Agent, or Firm* — Harness, Dickey & Pierce, P.L.C.

(57) ABSTRACT

A robot includes an arm, a wrist and a rotation support mechanism The rotation support mechanism has a shaft section provided in the wrist and an outer shape of which is a column shape; a bearing which is disposed on an outer periphery section of the shaft section and rotatably supports the shaft section around a center axis thereof; an annular-shaped ring member provided in the wrist and is concentrically disposed with the bearing by separating on the outer periphery side of the bearing; and an annular-shaped oil seal provided in the arm and slides with respect to the ring member by abutting the outer periphery section of the ring member and holding airtightness with the ring member according to the rotation of the center shaft of the shaft section.

15 Claims, 13 Drawing Sheets

(56) References Cited

U.S. PATENT DOCUMENTS

| | | | | |
|---|---|---|---|---|
| 2013/0264777 | A1* | 10/2013 | Himeno | F16J 15/3208 277/549 |
| 2014/0021687 | A1* | 1/2014 | Berdichevsky | F16J 15/322 277/560 |
| 2014/0196554 | A1* | 7/2014 | Kato | F16H 1/32 74/89.16 |
| 2014/0225332 | A1* | 8/2014 | Baart | F16J 15/162 277/549 |
| 2014/0251056 | A1* | 9/2014 | Preuss | B25J 9/042 74/490.05 |
| 2015/0068350 | A1* | 3/2015 | Kirihara | B25J 17/02 74/490.05 |
| 2015/0135880 | A1* | 5/2015 | Zaruba | B25J 9/042 74/490.01 |
| 2015/0219220 | A1* | 8/2015 | Berdichevsky | F16J 15/3208 277/554 |

FOREIGN PATENT DOCUMENTS

| | | |
|---|---|---|
| JP | 2003225883 A | 8/2003 |
| JP | 2004-125144 A | 4/2004 |

* cited by examiner

ROBOT

BACKGROUND

1. Technical Field

The present invention relates to a robot.

2. Related Art

In the related art, a robot is disclosed which includes a base stand (a base), a first arm disposed on the base stand side and a second arm connected to the first arm (for example, JP-A-2003-225883). In the robot disclosed in JP-A-2003-225883, a rotation mechanism is provided which rotatably supports the second arm with respect to the first arm around the rotation axis of a servo motor which is mounted in the second arm. The rotation mechanism has a ring-shaped bearing and an oil seal which is concentrically disposed with the bearing and holding airtightness inside each arm. Then, the bearing and the oil seal are disposed along the direction of the rotation axis. In such a disposition, the entire the first arm and the second arm are long in the direction of the rotation axis and, as a result, the size of the robot is increased. Thus, there is a problem in the robot that, for example, the operating speed is slow as the size of the robot being increased.

SUMMARY

An advantage of some aspects of the invention is to provide a robot in which reduction in the size thereof can be achieved.

An aspect of the invention is directed to a robot including two arms connected to each other; and a rotation support mechanism rotatably supporting one side arm to the other side arm of the two arms, wherein the rotation support mechanism has a shaft section which is provided in the one side arm and an outer shape of which is a column shape; a bearing which is disposed on an outer periphery section of the shaft section and rotatably supports the shaft section around a center axis of the shaft section; a ring-shaped ring member which is provided in the one side arm and is concentrically disposed with the center axis of the bearing in the outer periphery side of the bearing; and a ring-shaped oil seal which is provided in the other side arm and slides with respect to the ring member by abutting the outer periphery section of the ring member according to the rotation of the shaft section.

According to the aspect of the invention, the shaft section, the bearing, the ring member and the oil seal are concentrically disposed in the order from the center axis side of the shaft section. Then, the disposition can reliably achieve the reduction in the size of the robot in the direction of the center axis, compared to a case where, for example, the shaft section, the bearing, the ring member and the oil seal are disposed along the direction of the center axis.

In the robot of the aspect of the invention, it is preferable that the oil seal have a concave section which is formed in a circumferential direction of a ring of the oil seal and is open to the other side arm, and the opening of the oil seal abut the other side arm.

According to this configuration, the concave section is blocked by a portion of the other side arm. Accordingly, dust or dirt can be prevented from invading the concave section.

Another aspect of the invention is directed to a robot including two arms connected to each other; and a rotation support mechanism rotatably supporting one side arm to the other side arm of the two arms, wherein the rotation support mechanism includes; a shaft section which is provided in the one side arm and an outer shape of which is a column shape; a bearing which is disposed on an outer periphery section of the shaft section and rotatably supports the shaft section around a center axis of the shaft section; a ring-shaped ring member which is provided in the other side arm and is concentrically disposed with the center axis of the bearing in the outer periphery side of the bearing; and a ring-shaped oil seal which is provided in the one side arm and slides with respect to the ring member by abutting the outer periphery section of the ring member according to the rotation of the shaft section.

According to the aspect of the invention, the shaft section, the bearing, the ring member and the oil seal are concentrically disposed in the order from the center axis side of the shaft section. Then, the disposition can reliably achieve the reduction in the size of the robot in the direction of the center axis, compared to a case where, for example, the shaft section, the bearing, the ring member and the oil seal are disposed along the direction of the center axis.

In the robot of the aspect of the invention, it is preferable that the oil seal have a concave section which is formed in a circumferential direction of a ring of the oil seal and is open to the one side arm, and the opening of the oil seal abut the one side arm.

According to this configuration, the concave section is blocked by a portion of the one side arm. Accordingly, dust or dirt can be prevented from invading the concave section.

In the robot of the aspect of the invention, it is preferable that, when assuming an orthogonal axis orthogonal to the center axis, the bearing, the ring member and the oil seal be disposed on the orthogonal axis.

According to this configuration, the reduction in the size of the robot in the direction of the center axis can be further reliably achieved.

In the robot of the aspect of the invention, it is preferable that the oil seal have two rip sections formed in an inner periphery section of the oil seal in the circumferential direction of the ring and protrude toward the center axis; and lubricant is filled in a space enclosed by the inner periphery section of the oil seal, each rip section and the outer periphery section of the ring member.

According to this configuration, even though the oil seal slides with respect to the ring member, the abrasion due to the sliding can be reliably prevented or suppressed. In addition, it is possible to assist the oil seal to hold the airtightness.

In the robot of the aspect of the invention, it is preferable that the shaft section and the ring member be configured of separated bodies and be configured of materials different from each other.

According to this configuration, for example, a suitable material can be used in the molding or installation locations of the shaft section and the ring member.

In the robot of the aspect of the invention, it is preferable that the shaft section be configured of a material including iron or aluminum and the ring member be configured of stainless steel.

According to this configuration, for example, when the one side arm is configured of a material including iron or aluminum, and the shaft section can be integrally formed with the one side arm. Accordingly, the manufacturing cost of the robot can be reduced. In addition, the stainless steel is a relatively hard material among the metal materials and then the abrasion due to the sliding can be reliably prevented or suppressed even though the oil seal slides with respect to the ring member.

In the robot of the aspect of the invention, it is preferable that curing treatment be applied to the ring member.

According to this configuration, the abrasion due to the sliding can be reliably prevented or suppressed even though the oil seal slides with respect to the ring member.

In the robot of the aspect of the invention, it is preferable that the other side arm have a holding section which holds the bearing between the other side arm and the shaft section.

According to this configuration, the bearing can be reliably positioned and the one side arm can be reliably rotated around the shaft section with respect to the other side arm.

In the robot of the aspect of the invention, it is preferable that the one side arm have a manipulator at the end portion opposite to the other side arm.

According to this configuration, an object to be grasped can be transported by controlling the operation of each arm while grasping the object to be grasped such as parts with the manipulator.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot of the invention will be described in detail, based on preferable embodiments which are illustrated in annexed drawings.

First Embodiment

Figure 1:
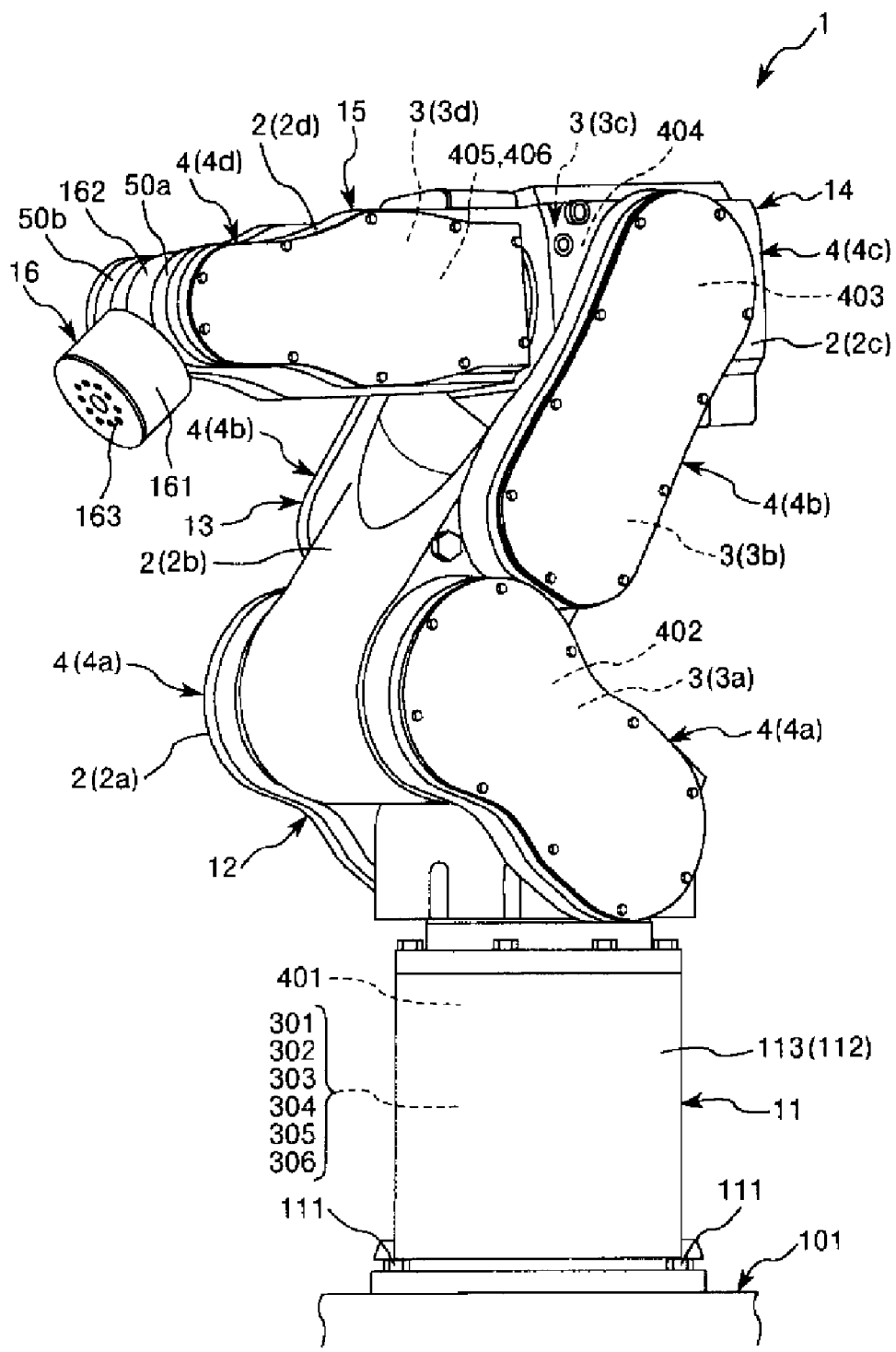
FIG. 1 is a perspective view of a robot (a first embodiment) of the invention which is viewed from front side.
Figure 2:
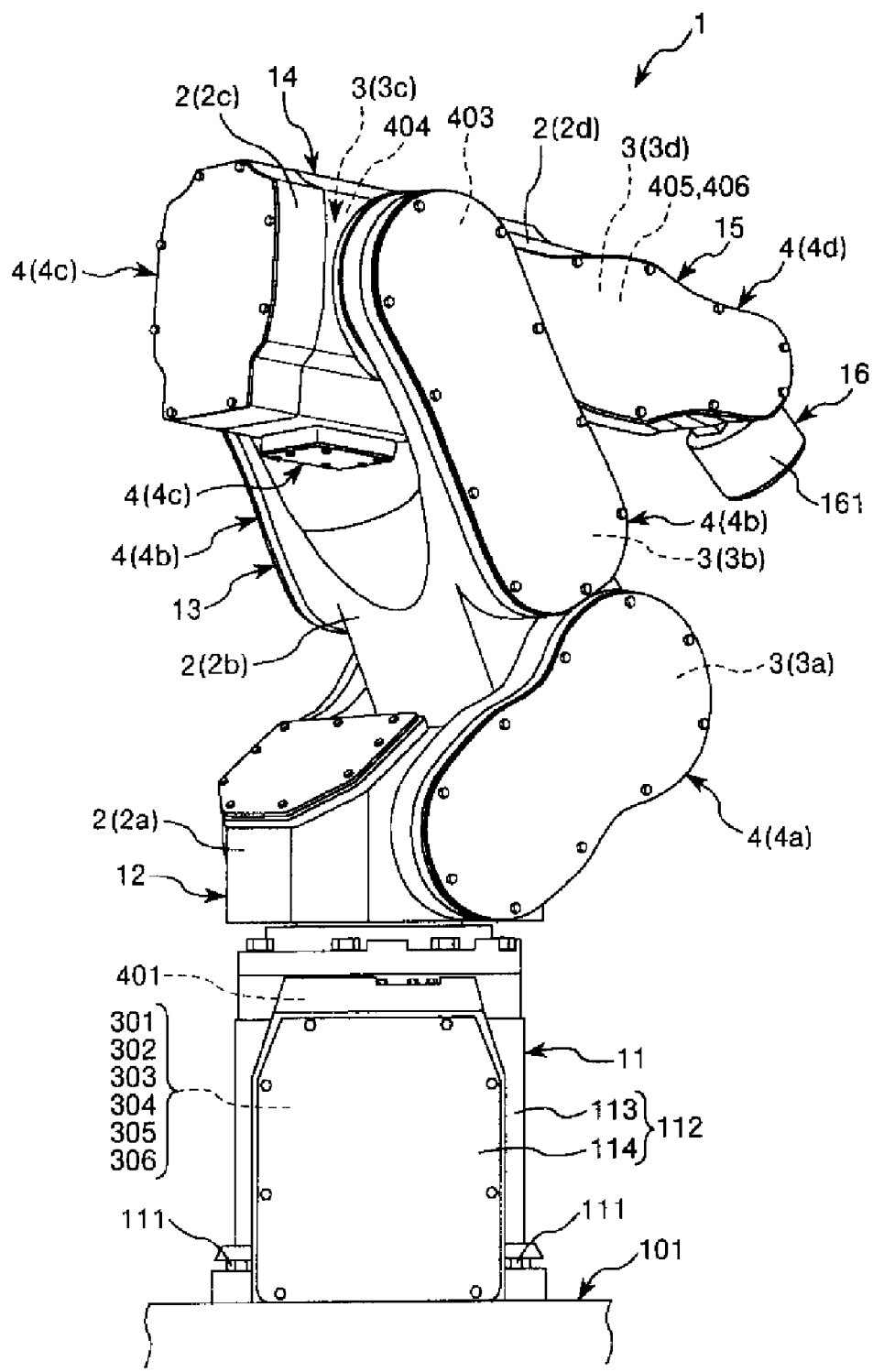
FIG. 2 is a perspective view of the robot (the first embodiment) of the invention which is viewed from rear side.
Figures 3, 4:
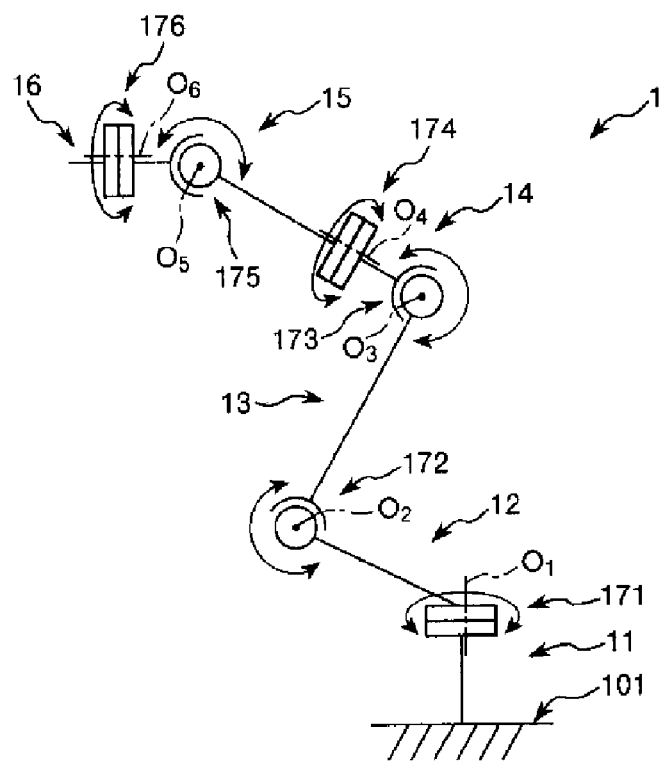
FIG. 3 is a schematic view of the robot illustrated in FIGS. 1 and 2.
FIG. 4 is a block diagram of a main portion of the robot illustrated in FIGS. 1 and 2.
Figure 5:
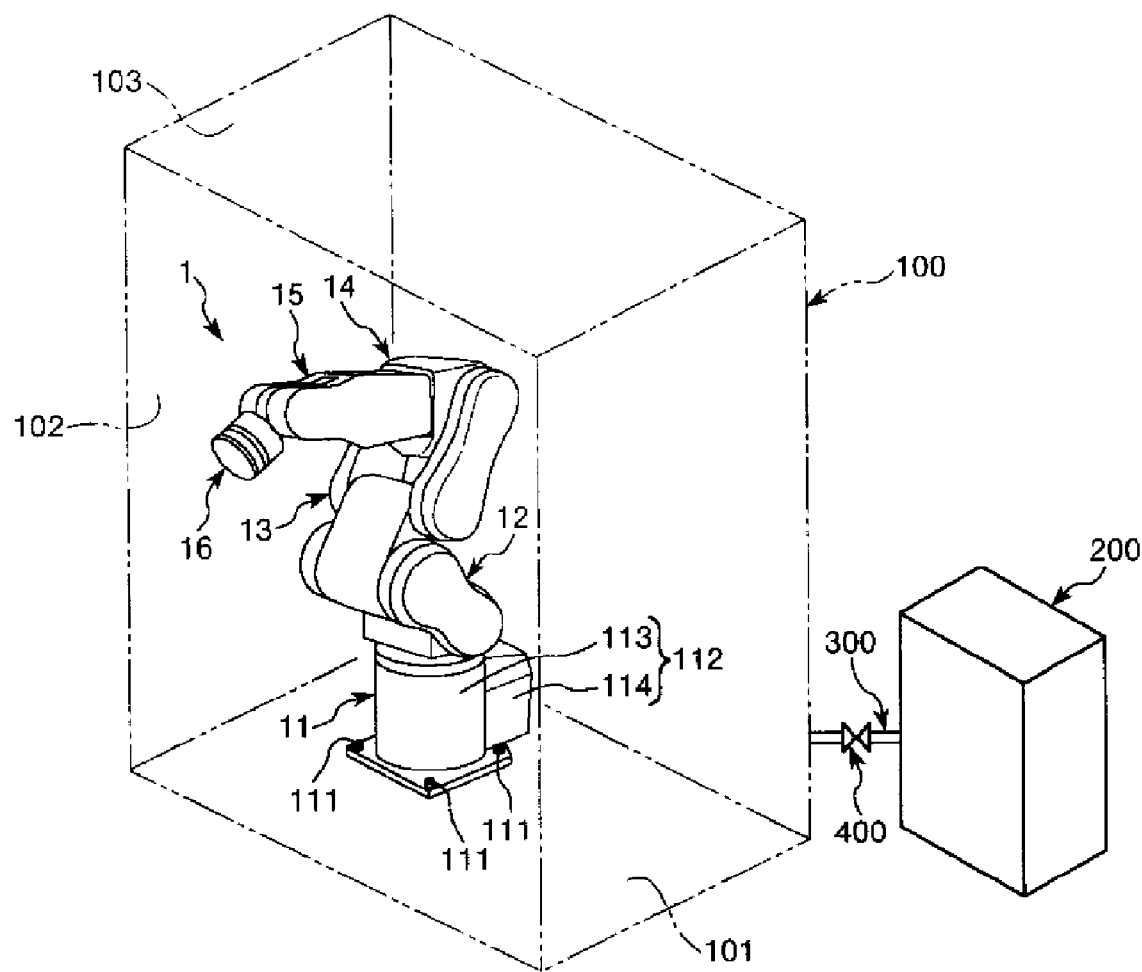
FIG. 5 is a perspective view illustrating a use state (an installation state) of the robot illustrated in FIGS. 1 and 2.
Figure 6:
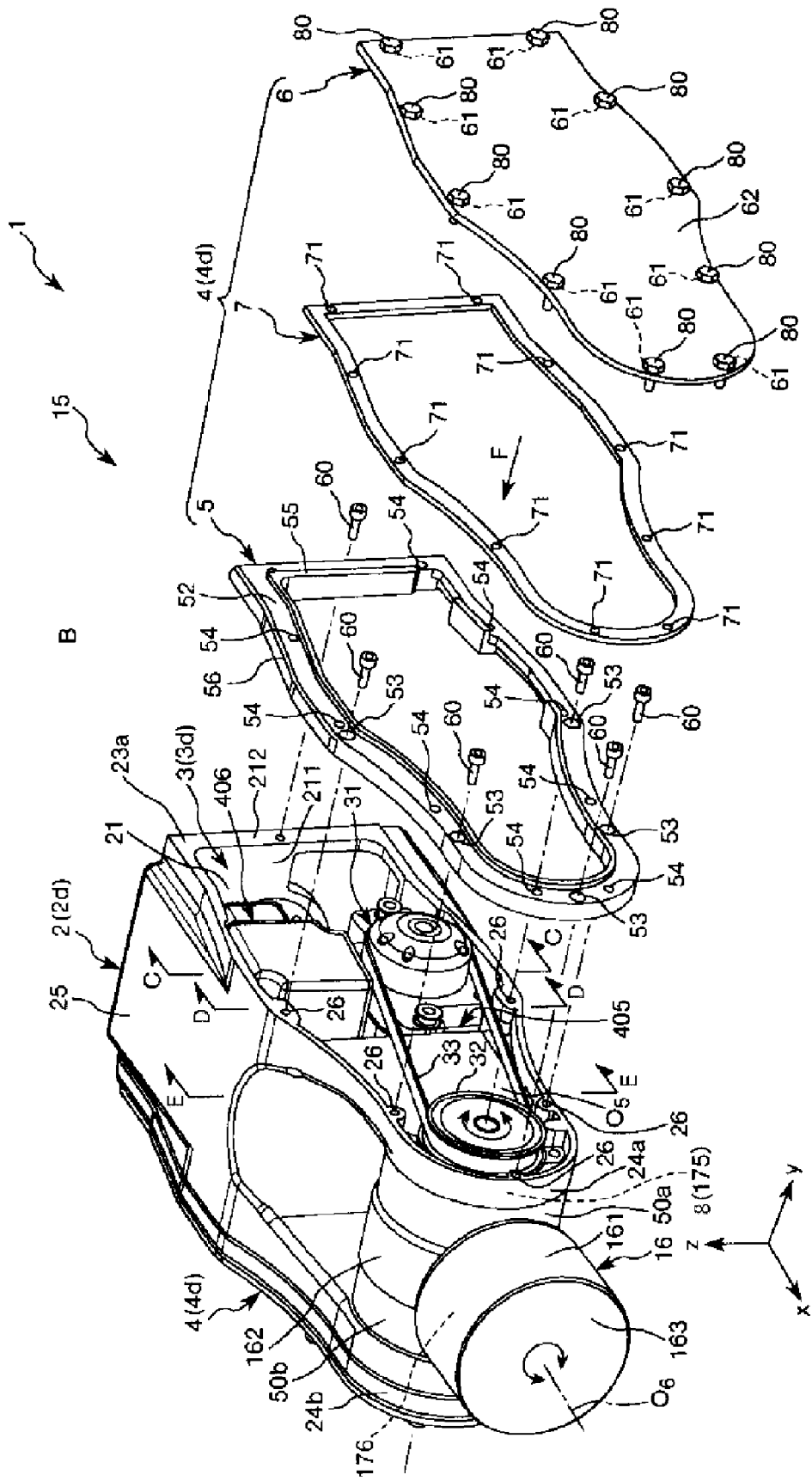
FIG. 6 is an exploded perspective view of one representative arm of a plurality of arms included in the robot illustrated in FIGS. 1 and 2.
Figure 7:
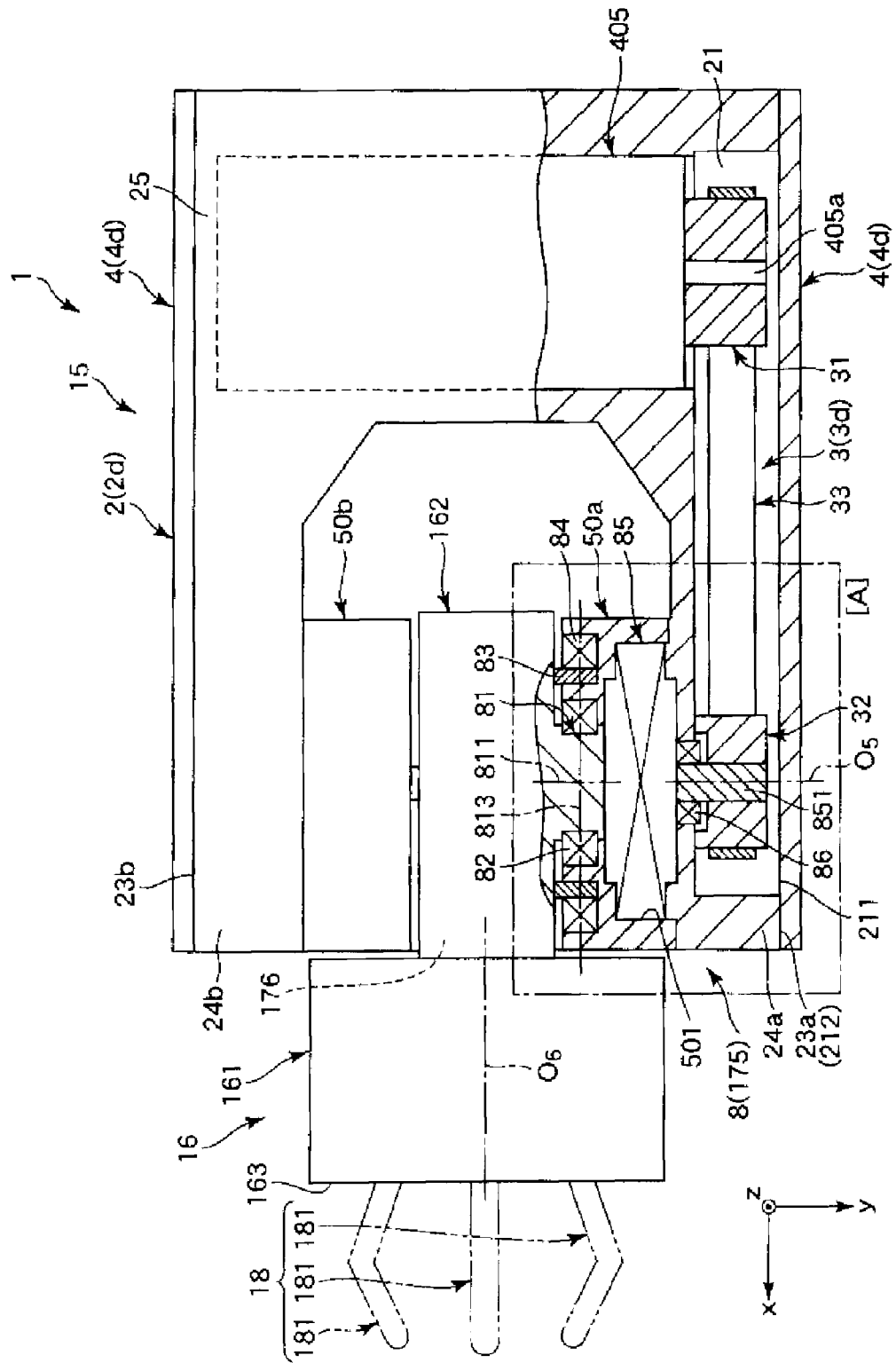
FIG. 7 is a schematic partial vertical cross-sectional view of the arm illustrated in FIG. 6.
Figure 8:
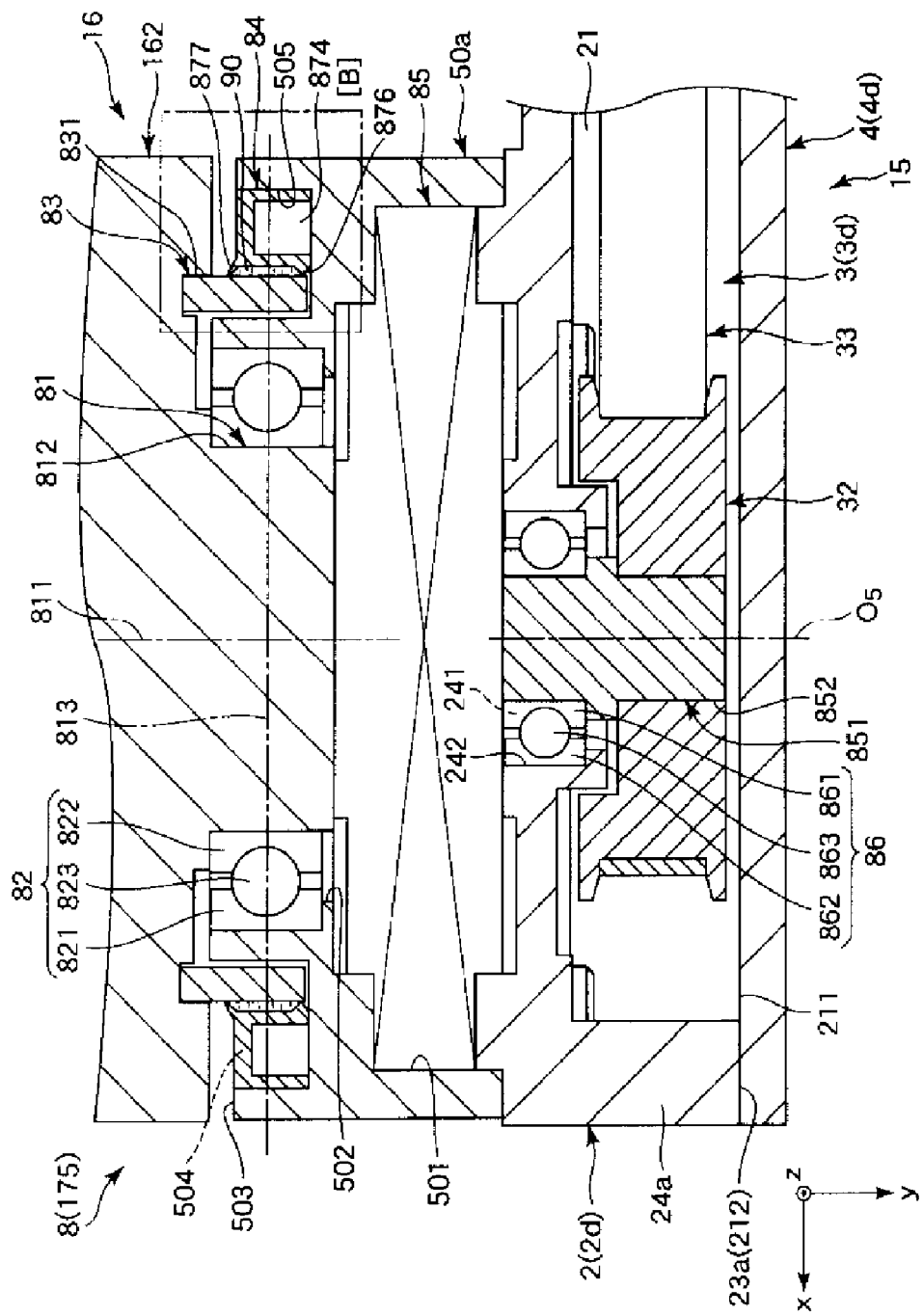
FIG. 8 is an enlarged detail view of a region A enclosed in a dashed line in FIG. 7.
Figure 9:
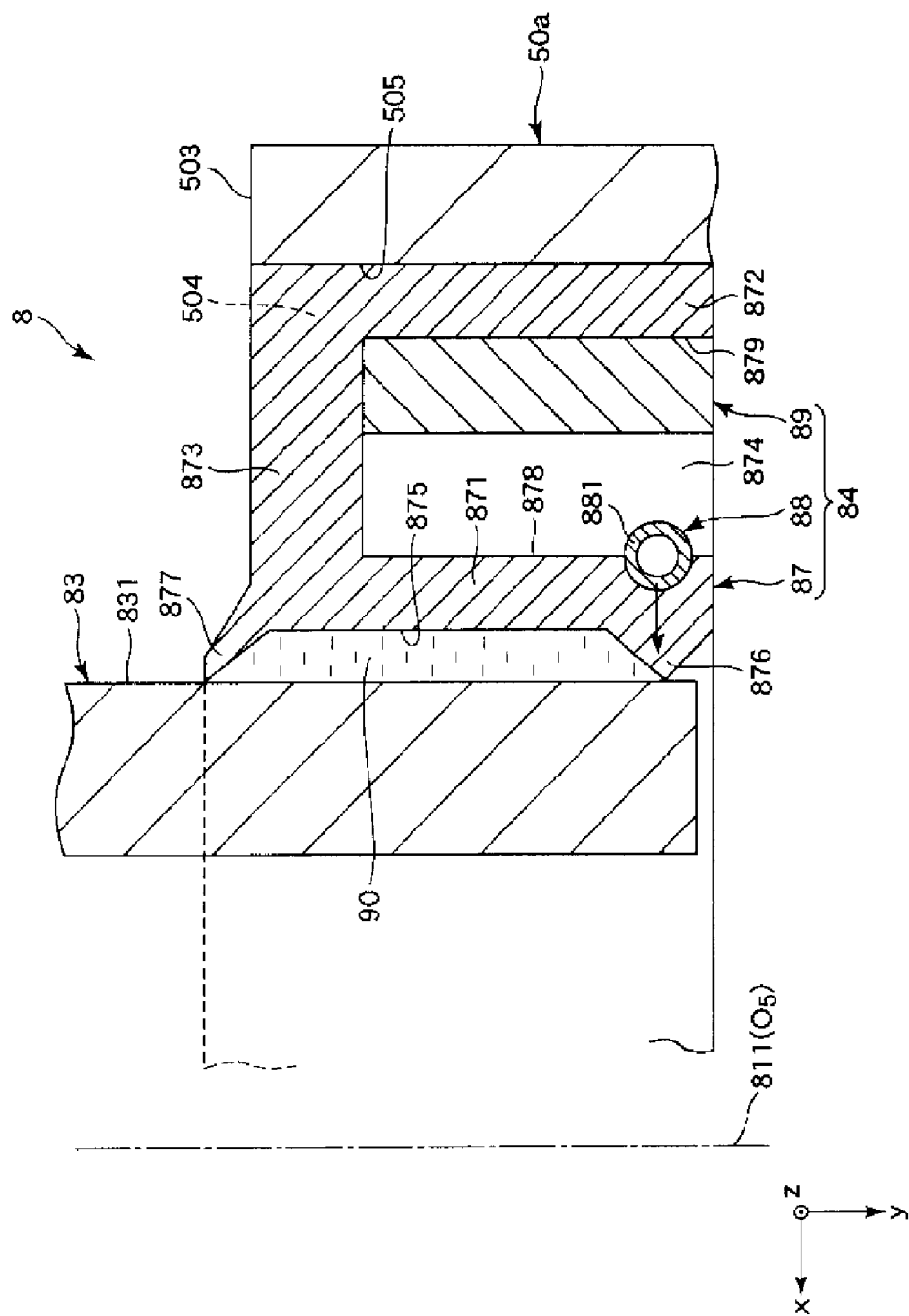
FIG. 9 is an enlarged detail view of a region B (a rotation support mechanism) enclosed in a dashed line in FIG. 8.
Figures 10A, 10B:
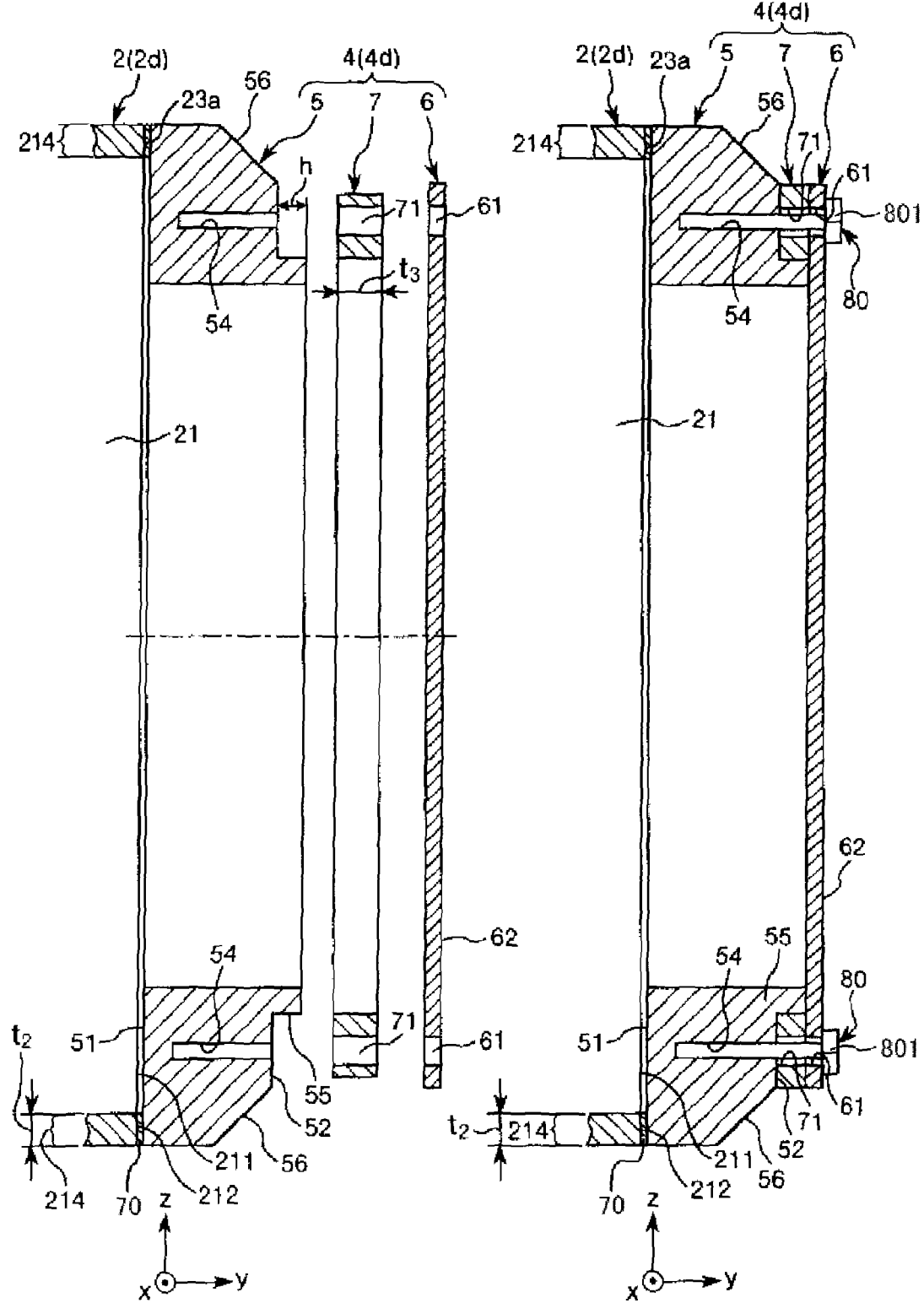
FIGS. 10A and 10B are cross-sectional views which are taken along a line C-C in FIG. 6.
Figure 11:
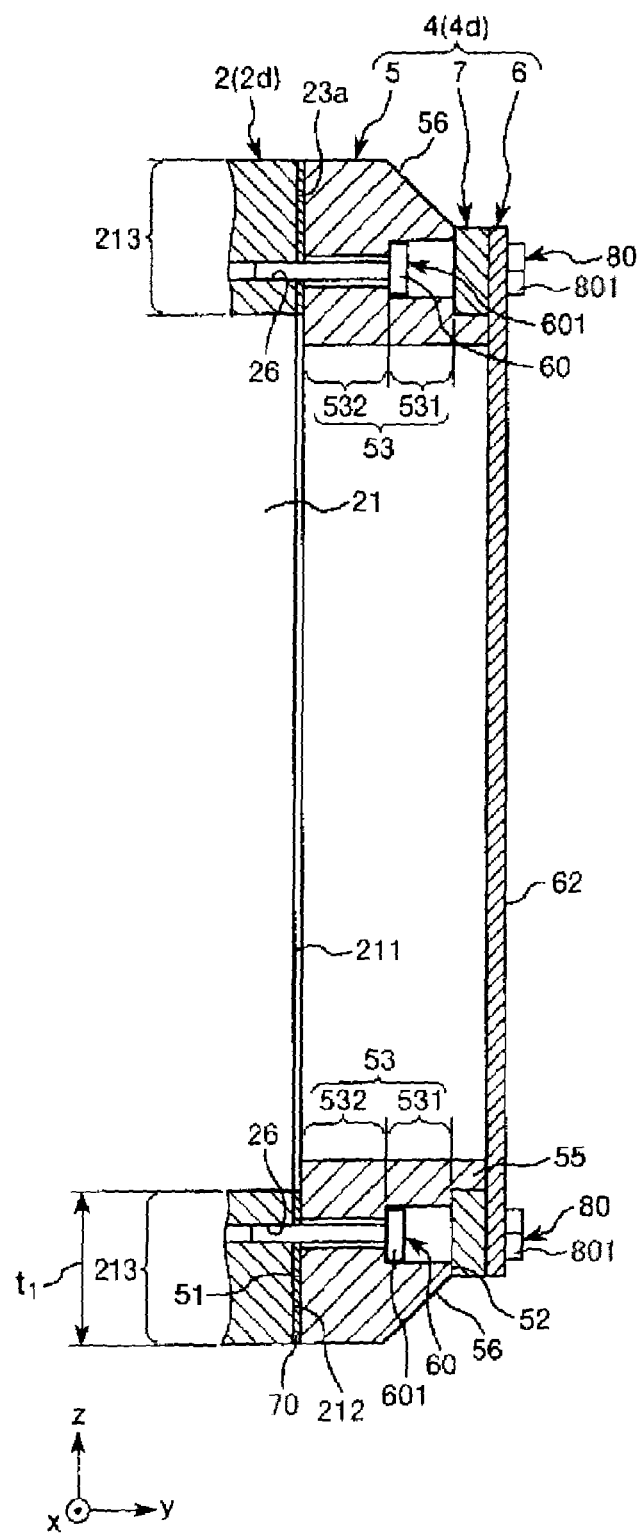
FIG. 11 is a cross-sectional view which is taken along a line D-D in FIG. 6.
Figure 12:
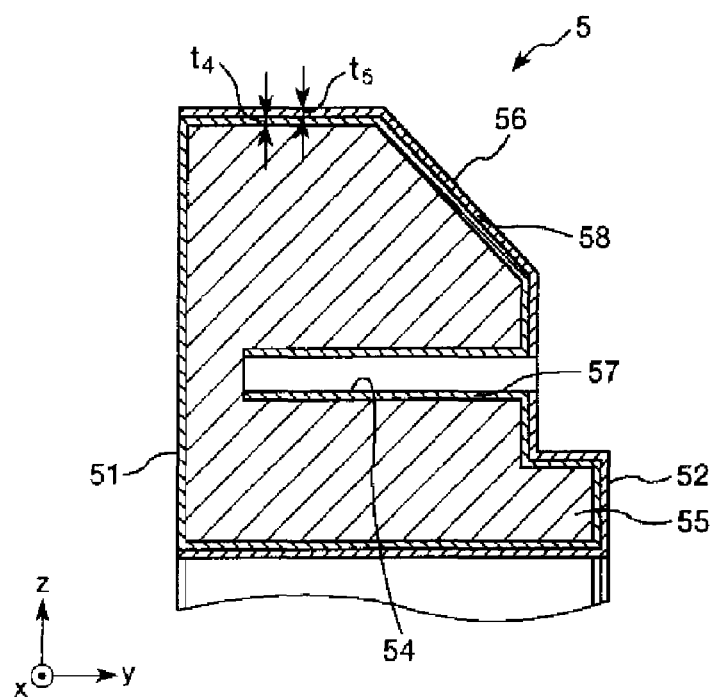
FIG. 12 is an enlarged cross-sectional view of a frame body included in the robot illustrated in FIGS. 1 and 2.
Figure 13:
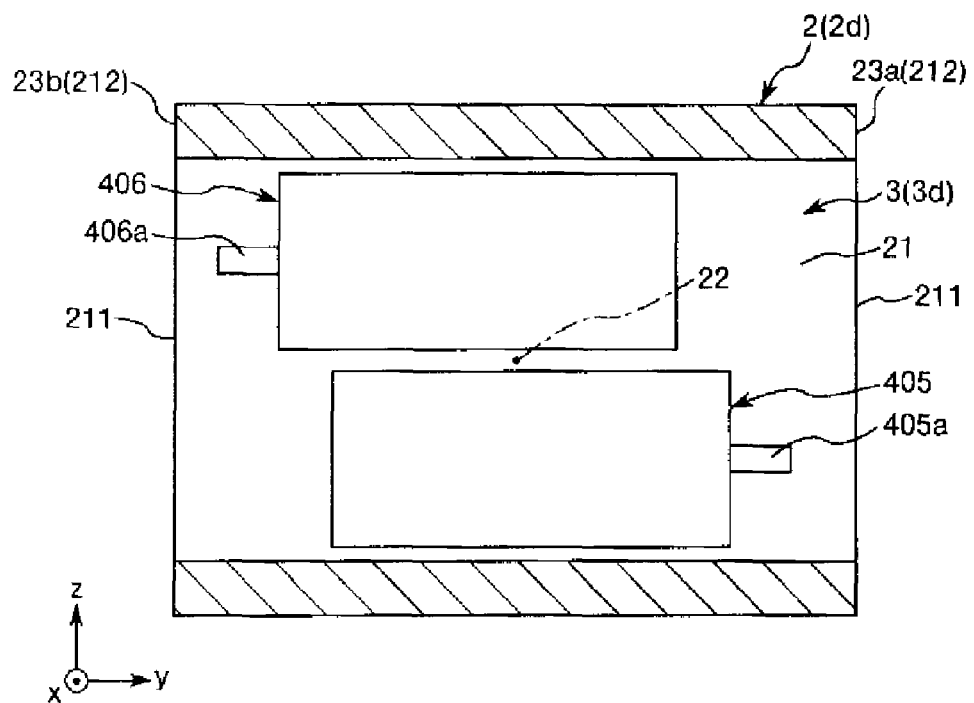
FIG. 13 is a cross-sectional view which is taken along a line E-E in FIG. 6.
Figure 14:
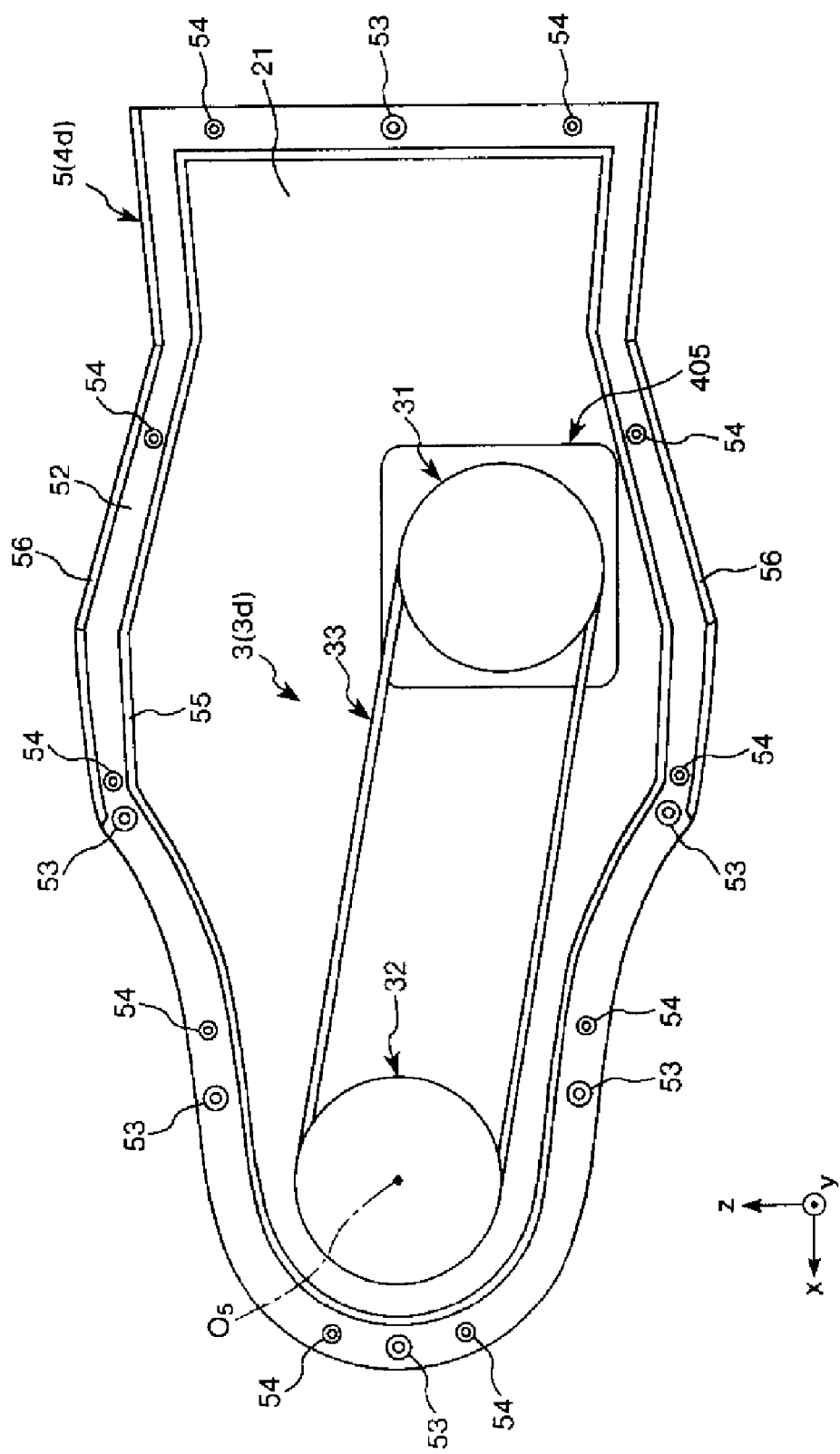
FIG. 14 is a view (a side view) which is viewed from an arrow direction F in FIG. 6.

FIG. 1 is a perspective view of the robot (the first embodiment) of the invention viewed from front side, FIG. 2 is a perspective view of the robot (the first embodiment) of the invention viewed from rear side, FIG. 3 is a schematic view of the robot illustrated in FIGS. 1 and 2, FIG. 4 is a block diagram of a main portion of the robot illustrated in FIGS. 1 and 2, FIG. 5 is a perspective view illustrating a use state (an installation state) of the robot illustrated in FIGS. 1 and 2, FIG. 6 is an exploded perspective view of one representative arm of a plurality of arms included in the robot illustrated in FIGS. 1 and 2, FIG. 7 is a schematic partial vertical cross-sectional view of the arm illustrated in FIG. 6, FIG. 8 is an enlarged detail view of a region A enclosed in a dashed line in FIG. 7, FIG. 9 is an enlarged detail view of a region B (a rotation support mechanism) enclosed in a dashed line in FIG. 8, FIGS. 10A and 10B are cross-sectional views which are taken along a line C-C in FIG. 6, FIG. 11 is a cross-sectional view which is taken along a line D-D in FIG. 6, FIG. 12 is an enlarged cross-sectional view of a frame body included in the robot illustrated in FIGS. 1 and 2, FIG. 13 is a cross-sectional view which is taken along a line E-E in FIG. 6 and FIG. 14 is a view (a side view) which is viewed from an arrow direction F in FIG. 6. For the sake of convenience of the description, in FIGS. 1 to 3, 5, 6 and 10A to 14, upside is referred to as "up" or "above", downside is referred to as "down" or "below". In addition, in FIGS. 1 to 3 and 5, base stand side is referred to as "base end" and the opposite side thereof is referred to as "front end". In addition, in FIGS. 6 to 14 (the same as in FIG. 15), the longitudinal direction of an arm is referred to as "x-axis direction", a direction perpendicular to the x-axis direction and the horizontal direction is referred to as "y-axis direction" and a direction perpendicular to both the x-axis direction and the y-axis direction is referred to as "z-axis direction".

A robot (an industrial robot) 1 illustrated in FIGS. 1 to 3, for example, can be used in the inspection process to check precision instruments such as watches and includes a base stand 11, four arms (links) 12, 13, 14 and 15, and a wrist (link) 16. In addition, the robot 1 is a vertically articulated (six shafts) robot in which the above members are connected in the order. Furthermore, in the vertically articulated robot, the base stand 11, the arms 12 to 15 and the wrist 16 may be collectively referred to as "the arm", and the base stand 11 may be referred to as "a first arm", the arm 12 may be referred to as "a second arm", the arm 13 may be referred to as "a third arm", the arm 14 may be referred to as "a fourth arm", the arm 15 may be referred to as "a fifth arm" and the wrist 16 may be referred to as "a sixth arm", respectively.

As illustrated in FIG. 3, each of the arms 12 to 15 and the wrist 16 is displaceably supported on the base stand 11 independently.

The base stand 11 and the arm 12 are connected via an articulation (a joint) 171. Then, the arm 12 is able to rotate around a rotation axis $O_1$ in parallel with the vertical direction with respect to the base stand 11. The rotation around the rotation axis $O_1$ is carried out by driving of a motor 401. In addition, the driving of the motor 401 is controlled by a motor driver 301 which is electrically connected to the motor 401 via a cable (not illustrated) (see, FIG. 4).

The arm 12 and the arm 13 are connected via an articulation (a joint) 172. Then, the arm 13 is able to rotate around a rotation axis $O_2$ in parallel with the horizontal direction with respect to the arm 12 (the base stand 11). The rotation around the rotation axis $O_2$ is carried out by driving of a motor 402. In addition, the driving of the motor 402 is controlled by a motor driver 302 which is electrically connected to the motor 402 via a cable (not illustrated) (see, FIG. 4).

The arm 13 and the arm 14 are connected via an articulation (a joint) 173. Then, the arm 14 is able to rotate around a rotation axis $O_3$ in parallel with the horizontal direction with respect to the arm 13 (the base stand 11). The rotation around the rotation axis $O_3$ is carried out by driving of a motor 403. In addition, the driving of the motor 403 is controlled by a motor driver 303 which is electrically connected to the motor 403 via a cable (not illustrated) (see, FIG. 4).

The arm 14 and the arm 15 are connected via an articulation (a joint) 174. Then, the arm 15 is able to rotate around a rotation axis $O_4$ in parallel with a central axis direction of the arm 14 with respect to the arm 14 (the base stand 11). The rotation around the rotation axis $O_4$ is carried out by driving of a motor 404. In addition, the driving of the motor 404 is controlled by a motor driver 304 which is electrically connected to the motor 404 via a cable (not illustrated) (see, FIG. 4).

The arm 15 and the wrist 16 are connected via an articulation (a joint) 175. Then, the wrist 16 is able to rotate around a rotation axis $O_5$ in parallel with the horizontal direction (the y-axis direction) with respect to the arm 15 (the base stand 11). The rotation around the rotation axis $O_5$ is carried out by driving of a motor 405. In addition, the driving of the motor 405 is controlled by a motor driver 305 which is electrically connected to the motor 405 via a cable (not illustrated) (see, FIG. 4). In addition, the wrist 16 is also able to rotate around a rotation axis $O_6$ perpendicular to the rotation axis $O_5$ via an articulation (a joint) 176. The rotation around the rotation axis $O_6$ is carried out by driving of a motor 406. In addition, the driving of the motor 406 is controlled by a motor driver 306 which is electrically connected to the motor 406 via a cable (not illustrated) (see, FIG. 4).

The motors 401 to 406 are not particularly limited, however, for example, preferable to use a servo motor. In addition, each of the cables described above passes through the robot 1, respectively.

As illustrated in FIG. 4, the robot 1 is electrically connected to a personal computer (PC) 20 in which Central Processing Unit (CPU) is built as a control unit. Then, the personal computer 20 may actuate each of the arms 12 to 15 and the wrist 16, independently. In other words, the personal computer 20 may control the motors 401 to 406 via the motor drivers 301 to 306, independently. Control program thereof is stored beforehand in a recording medium built in the personal computer 20.

As illustrated in FIG. 5, in the embodiment, the robot 1 is provided inside an airtight chamber (an isolator) 100. The chamber 100 communicates with a sterilization gas generator 200 generating a sterilization gas (for example, hydrogen peroxide vapor) via a pipe 300. Then, the robot 1 is subjected to sterilization by the sterilization gas from the sterilization gas generator 200, before the start of work or after the completion of the work. In addition, the pipe 300 has a valve 400 in the middle of the longitudinal direction thereof. The valve 400 is intended to switch between a communication state in which the chamber 100 communicates with the sterilization gas generator 200 and a blocking state to block the communication state.

As described above, the robot 1 includes the base stand 11, the arms 12 to 15 and the wrist 16.

As illustrated in FIGS. 1 and 2, the base stand 11 is positioned lowermost of the vertically articulated robot and is a portion fixed to a floor 101 of the chamber 100 when the robot 1 is the vertically articulated robot. Fixing method is not particularly limited, however, for example, in the embodiment illustrated in FIGS. 1 and 2, a plurality of bolts 111 is used in the fixing method. In addition, fixing locations of the base stand 11 in the chamber 100 may be a wall 102 or a ceiling 103 of the chamber 100 other than the floor 101.

The base stand 11 has a hollow base stand body (a housing) 112. The base stand body 112 may be divided into a cylindrical section 113 having a cylindrical shape and a box-shaped section 114 having a box shape which is formed integrally on the outer periphery of the cylindrical section 113. Then, in such a base stand body 112, for example, the motor 401 or the motor drivers 301 to 306 are stored.

The arms 12 to 15 have a hollow arm body 2, a driving mechanism 3 and a sealing unit 4, respectively, and have substantially the same configuration except that installation locations with respect to the base stand 11, in other words, the installation locations in the entire robot 1 and, besides that, outer shapes thereof are different from each other. In addition, for the sake of the convenience of the description in below, the arm body 2, the driving mechanism 3 and the sealing unit 4 included in the arm 12 are referred to as "arm body 2a", "driving mechanism 3a" and "sealing unit 4a", respectively, and the arm body 2, the driving mechanism 3 and the sealing unit 4 included in the arm 13 are referred to as "arm body 2b", "driving mechanism 3b" and "sealing unit 4b", respectively, and the arm body 2, the driving mechanism 3 and the sealing unit 4 included in the arm 14 are referred to as "arm body 2c", "driving mechanism 3c" and "sealing unit 4c", respectively, and the arm body 2, the driving mechanism 3 and the sealing unit 4 included in the arm 15 are referred to as "arm body 2d", "driving mechanism 3d" and "sealing unit 4d", respectively.

In addition, the articulations 171 to 176 have a rotation support mechanism 8, respectively. The rotation support mechanism 8 is a mechanism in which one side arm of two arms connected to each other is rotatably supported to the other side arm. In a case where the arm 15 and the wrist 16 connected to each other are an example, the rotation support mechanism 8 may make the wrist 16 to rotate with respect to the arm 15.

The arm 12 is connected to an upstream end portion (a front end portion) of the base stand 11 in an inclined posture in the horizontal direction. In the arm 12, the driving mechanism 3a has the motor 402 and is stored inside the arm body 2a. In addition, the inside of the arm body 2a is airtightly sealed by the sealing unit 4a.

The arm 13 is connected to a front end portion of the arm 12. In the arm 13, the driving mechanism 3b has the motor 403 and is stored inside the arm body 2b. In addition, the inside of the arm body 2a is airtightly sealed by the sealing unit 4b.

The arm 14 is connected to a front end portion of the arm 13. In the arm 14, the driving mechanism 3c has the motor 404 and is stored inside the arm body 2c. In addition, the inside of the arm body 2c is airtightly sealed by the sealing unit 4c.

The arm 15 is connected to a front end portion of the arm 14 in parallel with the central axis direction thereof. In the arm 15, the driving mechanism 3d has the motors 405 and 406 and is stored inside the arm body 2d. In addition, the inside of the arm body 2d is airtightly sealed by the sealing unit 4d.

The wrist 16 (one side arm) is connected to a front end portion (an end portion opposite side of the base stand 11) of the arm 15 (the other side arm). As illustrated in FIG. 7, a manipulator 18 holding the precision instruments such as watches is detachably installed on the front end portion (the end portion opposite side of the arm 15) thereof in the wrist 16. In addition, the manipulator 18 is not particularly limited, however, for example, may be a manipulator which has a configuration having a plurality (three in the configuration illustrated in FIG. 7) of fingers 181. Then, the robot 1 may transport the precision instruments by controlling the operation of the arms 12 to 15, the wrist 16, or the like while holding the precision instruments with the manipulator 18.

As illustrated in FIGS. 6 and 7, the wrist 16 has a wrist body 161 having a cylindrical shape and a support ring 162 having a ring shape, which is configured of a separate body with the wrist body 161 and is provided in the base end portion of the wrist body 161.

The front end surface 163 of the wrist body 161 is a flat surface and is an installation surface on which the manipulator is installed. In addition, the wrist body 161 is connected to the driving mechanism 3d of the arm 15 via the articulation 176 and rotates around the rotation axis $O_6$ by the driving of the motor 406 of the driving mechanism 3d.

The support ring 162 is connected to the driving mechanism 3d of the arm 15 via the articulation 176 (the rotation support mechanism 8) and rotates around the rotation axis $O_5$ by the driving of the motor 405 of the driving mechanism 3d for each wrist body 161.

Next, the rotation support mechanism 8 which is included in the arms 12 to 15 and the articulations 171 to 176, respectively, is described detail. Since the arms 12 to 15 have substantially the same configuration as each other except that the installation locations in the entire robot 1 and the outer shapes thereof are different as described above, the arm 15 is typically described below. In addition, as described above, the arm 15 is connected to the wrist 16 via the articulation 175. Regarding the rotation support mechanism 8, the rotation support mechanism 8 included in the articulation 175 is typically described.

As illustrated in FIGS. 6 and 7, the arm 15 has the arm body 2 (2d), the driving mechanism 3 (3d), the sealing unit 4 (4d) and cylindrical parts 50a and 50b.

The arm body 2 is configured of an elongated body along the x-axis direction and the elongated body is configured of a pair of tongue sections 24a and 24b in the front end side, and a base section 25 in the base end side. The tongue section 24a and the tongue section 24b are separated in the y-axis direction. Then, the support ring 162 of the wrist 16 is disposed between the tongue section 24a and the tongue section 24b. Furthermore, the cylindrical part 50a is interposed between the tongue section 24a and the support ring 162, and the cylindrical part 50b is interposed between the tongue section 24b and the support ring 162. Accordingly, the wrist 16 is held on the arm 15.

In addition, the cylindrical part 50a is fixed to the tongue section 24a of the arm body 2, for example, by fitting and the cylindrical part 50b is fixed to the tongue section 24b of the arm body 2, for example, by fitting.

In addition, the arm body 2 has a storage section 21 storing the driving mechanism 3. The storage section 21 is configured of a concave section which is open to two side surfaces 23a and 23b (outer surface) disposed via a center axis 22 of the arm body 2 (see, FIG. 13). Accordingly, when maintenance with respect to the driving mechanism 3 is performed, the maintenance may be performed from the side surface 23a side and performed from the side surface 23b side. For example, when exchanging the motor 405, the exchange may be easily performed from the side surface 23a side and when exchanging the motor 406, the exchange may be easily performed from the side surface 23b side. As described above, the robot 1 has excellent maintenance.

The configuration material of the arm body 2 is not particularly limited, however, for example, various metal materials may be used and, among them, it is preferable to use aluminum or aluminum alloy, particularly. When the arm body 2 is a casting formed using a mold, the mold forming may be easily performed by using aluminum or aluminum alloy on the configuration material of the arm body 2.

In addition, configuration material of the cylindrical parts 50a and 50b, besides that, the above described base stand body 112 of the base stand 11, or configuration material of the support ring 162 of the wrist 16 may use the same as the configuration material of the arm body 2. In addition, the configuration material of the wrist body 161 of the wrist 16 is preferable to use a stainless steel.

As illustrated in FIGS. 6 and 13, the driving mechanism 3 has the motors 405 and 406. Both the motors 405 and 406 are maldistributed on the base section 25 side inside the storage section 21, that is, located on the base stand 11 side with respect to the arm body 2. The motors 405 and 406 are relatively heavy. Thus, when the arm 14 is rotated around the rotation axis $O_3$ together with the arm 15, the rotation may be carried out quickly if the motors 405 and 406 are located on the base section 25 side inside the arm 15 (the storage section 21).

The motor 405 has a rod shape and has a shaft (a shaft member) 405a rotatably supported around the axle thereof, and the shaft 405a protrudes toward the side surface 23a side (see, FIG. 13). The motor 406 has a rod shape and has a shaft (a shaft member) 406a on which the motor 406 is rotatably supported around the shaft thereof, and the shaft 406a protrudes toward the side surface 23a side (see, FIG. 13).

In addition, the driving mechanism 3 further has a first pulley 31 connected to the shaft 405a of the motor 405, a second pulley 32 which is separated from the first pulley 31 and is disposed in the tongue section 24a and a belt (a timing belt) 33 which is hung between the first pulley 31 and the second pulley 32. The first pulley 31, the second pulley 32 and the belt 33 are positioned on the side surface 23a side similar to the shaft 405a of the motor 405 and transmit the rotational force of the shaft 405a to the wrist 16 via the rotation support mechanism 8 and then the wrist 16 can be reliably rotated around the rotation axis $O_5$ (the second pulley 32).

In addition, the driving mechanism 3 also has the first pulley 31 connected to the shaft 406a of the motor 406, the second pulley 32 which is separated from the first pulley 31 and is disposed in the tongue section 24b and the belt 33 which is hung between the first pulley 31 and the second pulley 32 in the side surface 23b side. The first pulley 31, the second pulley 32 and the belt 33 in the side surface 23b side transmit the rotational force of the shaft 406a of the motor 406 to the wrist 16 and then the wrist 16 can be reliably rotated around the rotation axis $O_6$.

As illustrated in FIG. 13, the motor 405 and the motor 406 disposed symmetrically (point symmetry) about the center axis 22 of the arm body 2 as a center of symmetry (a point of symmetry). Furthermore, the first pulley 31, the second pulley 32 and the belt 33 which are sequentially connected to the motor 405 in the side surface 23a side, and the first pulley 31, the second pulley 32 and the belt 33 which are sequentially connected to the motor 406 in the side surface 23b side are disposed symmetrically about the center axis 22 as the center of symmetry (point symmetry).

Such a symmetric disposition contributes to reduction of the size of the arm 15 (the arm body 2) and movable range of the arm 15 can be ensured as wide as possible. In addition, as described below, the sealing unit 4 (4d) of the side surface 23a side and the sealing unit 4 (4d) of the side surface 23b side may be a common configuration.

Next, the rotation support mechanism 8 connected to the driving mechanism 3 is described.

As illustrated in FIGS. 7 and 8, the rotation support mechanism 8 has a shaft section 81 provided on the wrist 16 (one side arm, the first arm), a bearing (a first bearing) 82 provided in an outer periphery section 812 of the shaft section 81, a ring member 83 (a first ring member) provided in the wrist 16, an oil seal 84 (a second ring member) provided in the arm (the other side arm, the second arm), a decelerator 85 connecting the shaft section 81 and the second pulley 32, and a bearing (a second bearing) 86 installed on the outer periphery section 852 of a shaft section 851 of the decelerator 85.

The shaft section 81 is disposed concentrically with the support ring 162 of the wrist 16 and protrudes from the support ring 162 toward the side surface 23a of the arm 15. In addition, the shaft section 81 may be integrally formed with the support ring 162 or may be stationary provided to the support ring 162.

In this case, the shaft section 81 may be configured of the same material as the configuration material of the support ring 162, that is, may be configured of aluminum or aluminum alloy (a material containing aluminum). Accordingly, when the shaft section 81 and the support ring 162 is integrally formed, the manufacturing cost of the robot 1 can be reduced compared to a case where the shaft section 81 and the support ring 162 are configured separately.

In addition, if the shaft section 81 is configured of a separated body from the support ring 162, as the configuration material of the shaft section 81, iron or the like may be used other than aluminum or aluminum alloy.

The outer shape of the shaft section 81 has a column shape and a center axis 811 thereof accords to the rotation axis $O_5$. Accordingly, the wrist 16 can be reliably rotated around the rotation axis $O_5$. In addition, the shaft section 81 is a solid body in the configuration illustrated in FIGS. 7 and 8, however, the invention is not limited to the configuration and it may be a hollow body.

The shaft section 81 having such a configuration is connected to the decelerator 85.

The decelerator 85 reduces the rotation speed of the shaft 405a of the motor 405 and transmits the driving force of the motor 405 to the shaft section 81 (the wrist 16), and is configured to have, for example, a plurality of gears (not illustrated) engaged to each other.

The decelerator 85 is fixed to a portion of the side surface 23a side of the arm 15 from a rib 502 of an inner periphery section 501 of the cylindrical part 50a. In addition, the rib 502 is a portion which protrudes from the inner periphery section 501 and is formed in a ring shape along the circumferential direction thereof.

In addition, the decelerator 85 is provided in one gear of the plurality of gears and has a shaft section 851 rotatably supports the second pulley 32. The shaft section 851 is fixed to the second pulley 32 via a key (not illustrated) and may be rotated with the second pulley 32.

As illustrated in FIG. 8, the bearing 82 is installed in the outer periphery section 812 of the shaft section 81 and the bearing 86 is installed in the outer periphery section 852 of the shaft section 851 of the decelerator 85.

The bearing 82 is a rolling bearing (a ball bearing) rotatably supporting the shaft section 81 around the center axis 811 thereof. The bearing 82 is configured of an outer ring 821, an inner ring 822 disposed concentrically with the outer ring 821 in the inside of the outer ring 821 and a rolling body (ball) 823 disposed between the outer ring 821 and the inner ring 822.

The inner ring 822 abuts the outer periphery section 812 of the shaft section 81. The outer ring 821 abuts the inner periphery section 501 of the cylindrical part 50a. Accordingly, the bearing 82 is held between the outer periphery section 812 of the shaft section 81 and the inner periphery section 501 of the cylindrical part 50a. Accordingly, the bearing 82 can be reliably positioned and the wrist 16 can be reliably rotated around the rotation axis $O_5$ with respect to the arm 15. In addition, in the robot 1, the inner periphery section 501 of the cylindrical part 50a (the arm 15) may be a portion which functions as a holding portion which holds the bearing 82 between the inner periphery section 501 and the outer periphery section 812 of the shaft section 81.

The bearing 86 is a rolling bearing (a ball bearing) which rotatably supports the shaft section 851 of the decelerator 85 around the center axis (the rotation axis $O_5$) thereof. The bearing 86 is configured of an outer ring 861, an inner ring 862 disposed concentrically with the outer ring 861 inside the outer ring 861 and a rolling body (ball) 863 disposed between the outer ring 861 and the inner ring 862.

The inner ring 862 abuts the outer periphery section 852 of the shaft section 851. The outer ring 861 abuts an inner periphery section 242 of a through hole 241 formed by passing through the tongue section 24a of the arm body 2. Accordingly, the bearing 86 is held between the outer periphery section 852 of the shaft section 851 and the inner periphery section 242 of the arm body 2. Accordingly, the bearing 86 can be reliably positioned. In addition, the shaft section 851 can be reliably rotated around the rotation axis $O_5$.

As illustrated in FIGS. 7 and 8, the circular ring member 83 (a first ring member) is disposed concentrically with the shaft section 81 (the bearing 82) in the support ring 162 of the wrist 16. Furthermore, the ring member 83 (the first ring member) is disposed on the outer periphery side of the bearing 82 by being separated from the bearing 82.

The ring member 83 (the first ring member) is configured of a separated body from the support ring 162 (the shaft section 81) and is fixed to the support ring 162. A fixing method thereof is not particularly limited, however, for example, a fastening method using bolts, a method using fitting (press fitting) or the like may be used. Then, the ring member 83 (the first ring member) can be rotated around the rotation axis $O_5$ with the shaft section 81 by the fixing. In addition, the ring member 83 (the first ring member) may be integrally formed with the support ring 162 different from the embodiment.

In addition, the ring member 83 (the first ring member) protrudes from the support ring 162 toward the side surface 23a side of the arm 15 and is inserted into a concave section 504 formed recessively on a surface 503 of the opposite side of the side surface 23a side of the arm 15 of the cylindrical part 50a by being not contacted (see, FIG. 8). In addition, in the embodiment, the concave section 504 is formed in a ring shape around the rotation axis $O_5$ and functions as an installation portion in which the oil seal 84 (the second ring member) is installed.

The ring member 83 (the first ring member) may be configured of a material different from the support ring 162 (the shaft section 81). As described above, the support ring 162 is configured of a material including aluminum. Meanwhile, the ring member 83 (the first ring member) is preferable to use a stainless steel. The stainless steel is a relatively hard material among the metal materials and, as described below, the oil seal 84 (the second ring member) slides on the ring member 83 (the first ring member) and then abrasion thereof due to the sliding can be reliably prevented or suppressed by the used of the stainless steel. In addition, the stainless steel has excellent resistance to chemicals. For example, if medical agent is contained in a sterilization gas, the medical agent attaches to the ring member 83 (the first ring member) and, for example, corrosion may be caused according to the type of the medical agent. However, the corrosion can be reliably prevented by using the stainless steel as the configuration material of the ring member 83 (the first ring member).

In addition, the ring member 83 (the first ring member) is preferable to be subjected to curing treatment. The abrasion in the ring member 83 (the first ring member) due to the sliding of the oil seal 84 (the second ring member) can be further reliably prevented or suppressed by the curing treatment. In addition, the curing treatment is not particularly limited, however, for example, nitriding treatment or carburizing treatment may be used. The stainless steel configuring the ring member 83 (the first ring member) is a material capable of the curing treatment.

As described above, the concave section 504 of the cylindrical part 50*a* has the annular oil seal 84 (the second ring member). As illustrated in FIGS. 8 and 9, the oil seal 84 (the second ring member) abuts the outer peripheral portion 831 of the ring member 83 (the first ring member) and may holds airtightness with the ring member 83 (the first ring member). Accordingly, an inner portion (for example, the storage section 21 or the like) from the ring member 83 (the first ring member) of the robot 1 and an outer portion (outside air) from the ring member 83 (the first ring member) are blocked (hereinafter, the blocking function is referred to as "sealing"), and the sterilization gas can be prevented from intruding in the inner portion.

The oil seal 84 (the second ring member) is compressed by being held between the outer periphery section 505 of the concave section 504 and the outer periphery section 831 of the ring member 83 (the first ring member). Accordingly, the oil seal 84 (the second ring member) is reliably fixed to the concave section 504 and then may be prevented from separating from the concave section 504.

In addition, when the ring member 83 (the first ring member) rotates around the rotation axis $O_5$ (the center axis 811) together with the wrist 16, the oil seal 84 (the second ring member) slides against the ring member 83 (the first ring member) with the rotation thereof. Accordingly, sealing is exhibited even when sliding and then intrusion of the sterilization gas can be prevented.

As illustrated in FIG. 9, the oil seal 84 (the second ring member) is an elastic body configured of a seal body section 87, a coil spring 88 and a stiffener 89.

The seal body section 87 has an inner-wall section 871 and an outer-wall section 872 which are disposed concentrically about the rotation axis $O_5$, and furthermore, has a connection section 873 connecting the inner-wall section 871 and the outer-wall section 872. Then, the inner-wall section 871, the outer-wall section 872 and the connection section 873 are integrally formed.

In addition, the portion enclosed by the inner-wall section 871, the outer-wall section 872 and the connection section 873 is the concave section 874. The concave section 874 is formed along the circumferential direction of the oil seal 84 (the second ring member) and may store the coil spring 88 and the stiffener 89. In addition, the oil seal 84 (the second ring member) is disposed so that the concave section 874 opens to the arm 15 (the other side arm) side (see, FIG. 8). Accordingly, the concave section 874 is closed by the cylindrical part 50*a* and then dust or dirt can be prevented from invading the concave section 874.

In addition, the concave section 874 is formed thereby reducing the weight of the oil seal 84 (the second ring member). Accordingly, it contributes to the improvement of the operation speed of the arm body 2.

Two rip sections 876 and 877 are formed to protrude toward the rotation axis $O_5$ side in the inner periphery section 875 of the inner-wall section 871. The rip sections 876 and 877 are formed along the circumferential direction of the inner periphery section 875, respectively, and abut the outer periphery section 831 of the ring member 83 (the first ring member). Then, lubricant 90 is filled in a space enclosed by the rip sections 876 and 877, the inner periphery section 875 and the outer periphery section 831 of the ring member 83 (the first ring member). Accordingly, the abrasion in the ring member 83 (the first ring member) due to the sliding of the oil seal 84 (the second ring member) can be further reliably prevented or suppressed. In addition, sealing property is also improved.

In addition, the lubricant 90 is not particularly limited, however, for example, silicon oil, glycerin, polyethylene glycol or the like may be used.

In addition, the elastic material configuring the seal body section 87 is not particularly limited, however, for example, various types of rubber materials (especially, vulcanized rubber) such as styrene butadiene rubber, nitrile rubber, chloroprene rubber, butyl rubber, acrylic rubber, ethylene propylene rubber, urethane rubber, silicone rubber and fluorine rubber, and various types of thermoplastic elastomers such as styrene-based, polyvinyl chloride-based, polyurethane-based, polyester-based, polyamide-based, polybutadiene-based, fluorine rubber-based, chlorinated polyethylene-based or the like may be used, and a mixture of one or more of those may be used.

The coil spring 88 is made by winding a wire material 881 in a spiral shape. The coil spring 88 is provided in the outer periphery section 878 of the inner-wall section 871 of the seal body section 87 along the circumferential direction thereof and a portion thereof is embedded in the outer periphery section 878. In addition, the coil spring 88 is positioned at a position corresponding to the rip section 876 of the outer periphery section 878, that is, is positioned at a position opposite side of the rip section 876 and biases the rip section 876 toward the center axis $O_5$ side. Accordingly, the rip section 876 can reliably abut the outer periphery section 831 of the ring member 83 (the first ring member).

The stiffener 89 is configured of a plate material having a band shape. The stiffener 89 is provided in closely contact with the inner periphery section 879 of the outer-wall section 872 of the seal body section 87 along the circumferential direction thereof. Accordingly, the seal body section 87 can be reinforced.

In addition, the configuration material of the coil spring 88 and the stiffener 89 is not particularly limited, however, for example, stainless steel or the like may be used.

As illustrated in FIGS. 7 and 8, in the rotation support mechanism 8 having the configuration described above, the shaft section 81, the bearing 82, the ring member 83 (the first ring member) and the oil seal 84 (the second ring member) are disposed concentrically in the order from the center axis 811 (the shaft section 81) side. The disposition can reliably reduce the size of the articulation 175 (the robot 1) in the direction of the center axis 811, compared to that, for example, the shaft section 81, the bearing 82, the ring member 83 (the first ring member) and the oil seal 84 (the second ring member) are disposed along the direction of the center axis 811. Then, such a reduction of the size contributes to the improvement of the operation speed of the robot 1.

Furthermore, when assuming an orthogonal axis 813 orthogonal to the center axis 811, in the rotation support mechanism 8, the bearing 82, the ring member 83 (the first ring member) and the oil seal 84 (the second ring member) are disposed on the orthogonal axis 813. In other words, in the rotation support mechanism 8, when the bearing 82, the ring member 83 (the first ring member) and the oil seal 84 (the second ring member) are viewed from the direction of the orthogonal axis 813, those are disposed to be overlapped. According to such a disposition, the reduction of the size of the articulation 175 in the direction of the center axis 811 is remarkable. Thus, it contributes to the further improvement of the operation speed of the robot 1.

Next, the sealing unit 4 (4*d*) is described. In the arm 15, the sealing unit 4 is provided in the side surface 23*a* side and the side surface 23*b* side, respectively. Since the sealing unit 4 in the side surface 23*a* side and the sealing unit 4 in the side surface 23*b* side are the same configuration as each other, the sealing unit 4 in the side surface 23*a* side is typically described below.

The sealing unit 4 airtightly seals the storage section 21. Waterproof function and dustproof function are exhibited to the driving mechanism 3 (3*d*) inside the storage section 21 by the sealing unit 4. In addition, the sterilization gas from the sterilization gas generator 200 may corrodes the driving mechanism 3, however, the corrosion can be reliably prevented by the sealing unit 4.

As illustrated in FIGS. 6, 10A, 10B and 11, the sealing unit 4 has a frame body 5, a packing 7 and a cover 6, and those are overlapped in the order from the arm body 2 side.

As illustrated in FIG. 6, the frame body 5 is a member having a frame shape along an edge 212 of an opening section 211 which is open to the side surface 23*a* (the outer surface) of the storage section 21 of the arm body 2. A thickness of the member is, for example, may be approximately 10 mm.

As illustrated in FIGS. 10A, 10B and 11, the frame body 5 has a rear surface 51 which is joined to the edge 212 via an adhesive layer (adhesive) 70. The adhesive layer 70 is formed along the edge 212. Accordingly, an interval between the rear surface 51 of the frame body 5 and the edge 212 of the arm body 2 is reliably prevented from occurring, and the airtightness inside the storage section 21 can be ensured. As described above, the adhesive layer 70 also functions as "a gasket (packing)" filling between the rear surface 51 of the frame body 5 and the edge 212 of the arm body 2.

In the robot 1, the adhesive layer 70 is responsible for fixing the arm body 2 to the frame body 5. Furthermore, in the robot 1, a plurality (for example, six) of bolts 60 are responsible for ancillary fixing to the arm body 2 of the frame body 5 (see, FIGS. 6 and 11). Accordingly, the arm body 2 and the frame body 5 are fixed more firmly. In addition, the arm body 2 may be fixed to the frame body 5 by the bolt 60 temporally until the adhesive layer 70 is cured.

In the frame body 5, an insertion hole 53 into which each bolt 60 is inserted is formed to pass through from a front surface 52 to the rear surface 51. As illustrated in FIGS. 6 and 14, each insertion hole 53 is disposed having a interval along the circumferential direction of the frame body 5. In addition, as illustrated in FIG. 11, each insertion hole 53 has "counterbore" and is configured of two portions of which inner diameters are different from each other, that is, is configured of a large diameter section 531 having a large inner diameter in the front surface 52 side and a small diameter section 532 having a small inner diameter in the rear surface 51. Accordingly, a head section 601 of each bolt 60 is prevented from protruding from the front surface 52 of the frame body 5 and then the head section 601 can be reliably prevented from inhibiting the disposition of the packing 7 as described below.

Meanwhile, a female screw 26 is formed at a portion corresponding to each insertion hole 53 of the edge 212 of the arm body 2. Then, the bolt 60 inserted each insertion hole 53 of the frame body 5 can be screwed in each female screw 26. Accordingly, the ancillary fixing described above is accomplished.

In addition, as illustrated in FIGS. 10A, 10B and 11, in the edge 212 of the arm body 2, a portion in which the female screw 26 is formed and the other portion have different thicknesses. A thickness $t_1$ of the former (hereinafter, referred to as "thick section 213") is thicker than a thickness $t_2$ of the latter (hereinafter, referred to as "thin section 214") for the female screw 26 being formed. However, since formation region of the thin section 214 is wider than that of the thick section 213, reduction in the weight of the arm body 2 can be achieved.

The bolt 60 is not particularly limited, however, for example, it is preferable to use a so-called "hexagon socket head cap screw" of which fastening and unfastening are performed using a hexagon wrench.

As illustrated in FIGS. 6 and 14, in the front surface 52 of the frame body 5, a plurality (for example, ten in the illustrated configuration) of female screws 54 are formed in which a plurality (for example, ten in the illustrated configuration) of bolts 80 are screwed for fixing the cover 6 with respect to the frame body 5. Each female screw 54 is disposed along the circumferential direction of the frame body 5 having an interval. Accordingly, a fixing force by the bolts 80 is substantially uniformly distributed and then the cover 6 can be reliably fixed. In addition, the packing 7 can be uniformly compressed between the cover 6 and the frame body 5. Accordingly, the airtightness can be reliably ensured by the packing 7 (see, FIGS. 10B and 11).

In addition, as illustrated in FIGS. 10A and 10B, each female screw 54 is preferable to form until the middle of the frame body 5 in the thickness direction, that is, is preferable not to reach the rear surface 51.

In addition, the packing 7 is provided (placed) on the front surface 52 of the frame body 5. Accordingly, the front surface 52 also functions as a packing installation section on which the packing 7 is provided.

Then, the packing 7 provided on the front surface 52 is compressed by the cover 6. At this time, in the frame body 5, it is possible to regulate the compression limit for the packing 7 by a regulation section 55. Accordingly, the packing 7 can be compressed without any excess or deficiency. Thus, the airtightness inside the storage section 21 can be suitably secured. In addition, for example, when the packing 7 is exchanged multiple times during regular maintenance, it is possible to reliably regulate constant compression limit for the packing 7, in each time. As described above, the robot 1 has excellent maintenance.

Such a regulation section 55 protrudes toward the front surface 52 and configured of a rib formed along the circumferential direction of the frame body 5. A height h of the regulation section 55 is not particularly limited, however, for example, is preferable to compress a thickness $t_3$ to 10 to 40%, and is further preferable to compress to 20 to 30% when the thickness of the packing 7 is $t_3$ in the natural state that does not grant an external force (see, FIGS. 10A and 10B). For example, if the height h is 1.5 mm, the packing 7 can be compressed to 0.5 mm (25%) when the thickness $t_3$ is 2 mm.

In the frame body 5, a chamfered section 56, which is made by chamfering, is formed in a portion (at least a port) of the base end side of the outside edge thereof. Accordingly, the cover 6 mounted on the frame body 5 can be small for the chamfered section 56. Thus, reduction in the weight in the arm 15 (the robot 1) can be accomplished. In addition, interference of the arm 15 with the periphery is prevented for the chamfered section 56 and then the movable range of the arm 15 can be ensured as wide as possible.

As illustrated in FIG. 14, the frame body 5 does not overlap any of the motor 405, the first pulley 31, the second pulley 32 and the belt 33 in a side view of the arm body 2. Accordingly, when any of the motor 405, the first pulley 31, the second pulley 32 and the belt 33 is taken out from the storing section 21 during maintenance, the take-out work can be easily performed if any of them is pulled out in the front side (the direction opposite to the arrow F in FIG. 6) of the paper surface in FIG. 14. As described above, the robot 1 has excellent maintenance.

The configuration material of the frame body 5 is not particularly limited, however, for example, various types of metal materials can be used, and among them, it is preferable to use aluminum or aluminum alloy. When the frame body 5 is obtained from a metal plate that is a base material thereof by cutting process, the cutting process can be easily performed if the aluminum or aluminum alloy is used as the configuration material of the frame body 5. In addition, passivation treatment or plating treatment can be easily and reliably performed on the frame body 5. Accordingly, a first protection film 57 described below can be reliably formed.

When the frame body 5 having the same configuration as the above description is integrally formed with the arm body 2, the size of the arm body 2 that is a casting is increased greater than the size of the frame body 5. As a result, the weight of the arm body 2 is also increased and the operating speed of the arm body 2 is decreased. However, in the robot 1, since the arm body 2 is configured of a separated body from the frame body 5, such a problem can be prevented from occurring. In addition, the sealing unit 4 having the frame body 5 can be easily added on existing robot of related art.

In addition, for example, even though the female screw 54 of the frame body 5 is damaged, that is, a thread of the female screw 54 is destroyed by repeating the maintenance, if only the frame body 5 is exchanged, the cover 6 can be reliably installed in the exchanged frame body 5. Accordingly, the robot 1 can be safely used.

As illustrated in FIG. 12, the first protection film 57 and a second protection film 58 are formed in the frame body 5.

The first protection film 57 is formed at least in each female screw 54 (the entire surface of the frame body 5 in the embodiment) of the frame body 5. The first protection film 57 is a film to be subjected to the passivation treatment or plating treatment on the frame body 5. As described above, although the sterilization gas may corrode the driving mechanism 3, it is possible to reliably prevent the corrosion, particularly in each female screw 54 by the first protection film 57.

In addition, as the passivation treatment, alumite treatment is preferable and as the plating treatment, electroless nickel plating is preferable. Such a treatment is excellent in the corrosion resistance. In addition, when the first protection film 57 is formed, management of a thickness $t_4$ of the first protection film 57 can be easily performed. Accordingly, the first protection film 57 having a desired thickness is obtained.

The thickness $t_4$ of the first protection film 57 is not particularly limited, however, for example, is preferable to be 10 to 100 μm and is further preferable to be 30 to 80 μm.

The second protection film 58 is formed on a portion (a portion other than the rear surface 51 and each female screw 54 of the frame body 5 in the embodiment) except each female screw 54 of the frame body 5 to be overlapped on the first protection film 57. The second protection film 58 is a film formed by applying a material having liquid repellency. For example, if medical agent is contained in the sterilization gas, the medical agent attaches to the frame body 5 and may affect the frame body 5 according to the type of the medical agent. However, the attachment of medical agent can be reliably prevented by the second protection film 58.

In addition, the material having the liquid repellency is preferable to use fluorine-based material. Such a material has excellent chemical resistance. In addition, even though the medical agent attaches to the frame body 5, the medical agent can be easily wiped. In addition, the second protection film 58 has antifouling function and, for example, even though dust, dirt or oil attaches to the frame body 5, the foreign matter can be easily wiped.

The thickness $t_5$ of the second protection film 58 is not particularly limited, however, for example, is preferable to be 10 to 50 μm and is further preferable to be 20 to 40 μm. A contact angle of the second protection film 58 with water is not particularly limited, however, for example, is preferable to be 100 to 150 degrees and is further preferable to be 100 to 120 degrees.

In the frame body 5, the cover 6 having a planar plate shape is detachably installed. The storage section 21 can be covered with the installed cover 6. Accordingly, the driving mechanism 3 can be protected and it is possible to reliably prevent that a hand or the like accidentally touches the driving mechanism 3 during operation.

In the cover 6, through holes 61 in which the bolts 80 pass through are formed at positions corresponding to each female screw 54 of the frame body 5, respectively. Each through hole 61 is formed as a through hole passing through the cover 6 in the thickness direction. Then, in each female screw 54 of the frame body 5, the bolt 80 inserted into each through hole 61 of the cover 6 can be screwed. Accordingly, the cover is installed on the frame body 5, that is, becomes installation state. In addition, in the installation state, as described above, since the packing 7 is in the compressed state, the airtightness inside the storage section 21 of the arm body 2 is reliably held.

In addition, the cover 6 can be removed from the frame body 5 by loosening the bolts 80 from the installation state. In a state where the cover 6 is removed, a worker who performs the maintenance of the driving mechanism 3 can easily perform, for example, the maintenance such as exchange of the motor 405 by inserting a finger or the like into the storage section 21 of the arm body 2 via the frame body 5.

After the maintenance is performed, when the cover 6 is installed again with the frame body 5 through the bolts 80, the packing 7 is in the compressed state. Accordingly, the airtightness inside the storage section 21 of the arm body 2 can be reliably held again. In the robot 1 described above, the airtightness inside the storage section 21 can be reliably held regardless of before or after the maintenance.

The cover 6 is configured of a planar plate (for example, the thickness thereof is substantially 2 mm) made of completely flat metal. The metal material is not particularly limited, however, for example, is preferable to use stainless steel. Accordingly, deposition of dust, dirt or the like on the front surface 62 can be prevented or suppressed compared to a case where irregularities are formed on the front surface 62 of the cover 6. In addition, even though dust, dirt or the like is deposited, the foreign matter can be easily wiped.

In addition, the bolt 80 is not particularly limited, however, for example, a so-called "hexagon bolt" of which fastening and unfastening are performed using a spanner or a so-called "hexagon socket head cap screw" of which fastening and unfastening are performed using a hexagon wrench may be used, and, among them, "the hexagon bolt" is preferable. In "the hexagon bolt", since there are no irregularities in the head section 801 of the bolt 80 compared to "the hexagon socket head cap screw", deposition of dust, dirt or the like can be prevented or suppressed. In addition, even though dust, dirt or the like is deposited, the foreign matter can be easily wiped.

The compressed packing 7 is interposed between the frame body 5 and the cover 6. The packing 7 is a member having a frame shape similar to the frame body 5. The thickness of the member, for example, can be substantially 2 mm.

In addition, in the packing 7, the through holes 71 in which the bolts 80 pass through are formed at positions corresponding to each female screw 54 of the frame body 5, respectively. Each through hole 71 is configured of a through hole which passes through the packing 7 in the thickness direction. Then, each bolt 80 is screwed in the female screw 54 of the frame body 5 in a state of being passed through the through hole 71 (see, FIG. 10B). Accordingly, the packing 7 is positioned.

The configuration material of the packing 7 is not particularly limited, however, for example, may be the same as the configuration material of the seal body section 87 of the oil seal 84 (the second ring member).

Second Embodiment

Figure 15:
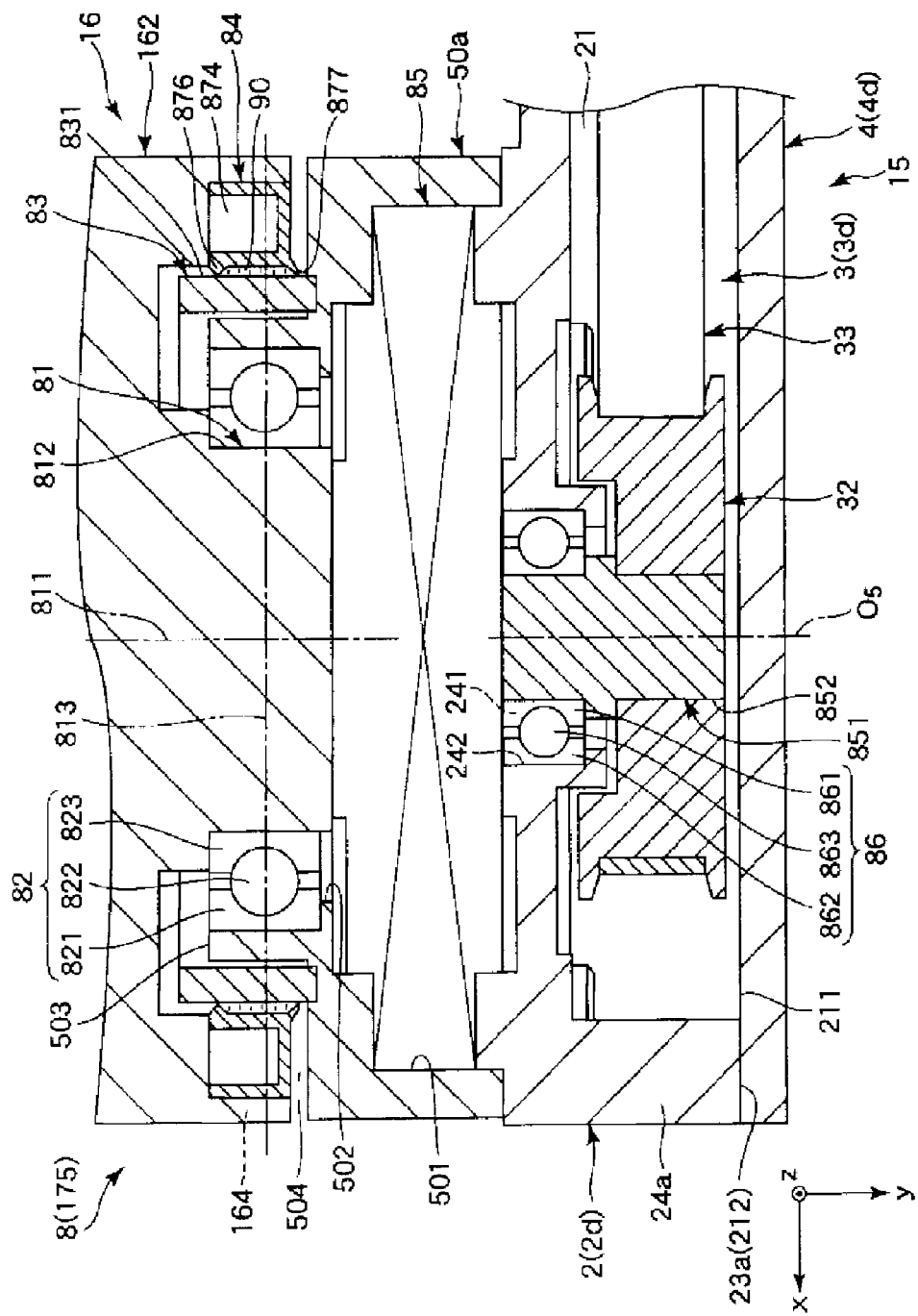
FIG. 15 is an enlarged detail view illustrating a rotation support mechanism included in a robot (a second embodiment) of the invention.

FIG. 15 is an enlarged detail view illustrating the rotation support mechanism included in the robot (the second embodiment) of the invention.

Hereinafter, the second embodiment of the robot of the invention will be described with reference to the drawing and the description focuses on the differences with the above embodiment, and the description of the similar items will be omitted.

The embodiment is the same as the first embodiment except that the disposition of the ring member and the oil seal included in the rotation support mechanism are different.

In the embodiment illustrated in FIG. 15, the rotation support mechanism 8 (the robot 1) is configured such that the ring member 83 (the first ring member) is fixed to the arm 15 (the other side arm) and the oil seal 84 (the second ring member) is fixed to the wrist 16 (one side arm).

The ring member 83 (the first ring member) is configured as a separated body from the cylindrical part 50a and is fixed to the concave section 504 of the cylindrical part 50a using fixing method such as a fastening method using bolts, a method using fitting (press fitting). In addition, the ring member 83 (the first ring member) may be integrally formed with the cylindrical part 50a different from the embodiment.

The oil seal 84 (the second ring member) is provided in a concave section 164 which is formed by being depressed on the surface facing the arm 15 side of the support ring 162 of the wrist 16. In addition, the concave section 164 is a portion which is formed in a ring shape along around the rotation axis $O_5$.

In addition, the oil seal 84 (the second ring member) is disposed so that the concave section 874 is open toward the wrist 16 side. Accordingly, the concave section 874 is blocked by the wrist 16. Thus, it is possible to prevent dust or dirt from invading in the concave section 874.

In the rotation support mechanism 8 having the configuration described above, the shaft section 81, the bearing 82, the ring member 83 (the first ring member) and the oil seal 84 (the second ring member) may be concentrically disposed in the order from the center axis 811 side. Accordingly, the reduction of the size of the articulation 175 in the direction of the center axis 811 can be reliably achieved. Thus, it contributes to the improvement of the operation speed of the robot 1.

The embodiments of the robot of the invention illustrated in the drawings are described, however, the invention is not limited to the embodiments. Each of the parts configuring the robot can be replaced with that of any configuration capable of exhibiting the same functions. In addition, any configuration matter may be added.

In addition, the robot of the invention may combine any two or more configurations (features) of each of the embodiments.

In addition, the number of the arms is six in each of the embodiments described above, however, the number of the arms in the robot of the invention is not limited to the embodiments, and for example, may be two, three, four, five, or seven or more.

The entire disclosure of Japanese Patent Application No. 2012-084351, filed Apr. 2, 2012 is expressly incorporated by reference herein.

What is claimed is:

1. A robot comprising:
a first side arm and a second side arm connected to each other; and
a rotation support mechanism rotatably supporting the first side arm and the second side arm,
wherein the rotation support mechanism includes;
a shaft section which is provided in the first side arm, and an outer shape of which is a column shape;
a bearing which is disposed on an outer periphery section of the shaft section and rotatably supports the shaft section around a center axis of the shaft section;
a ring-shaped ring member which is provided in the first side arm and is concentrically disposed with the center axis of the bearing in an outer periphery side of the bearing; and
a ring-shaped oil seal which is provided in the second side arm and abuts an outer periphery section of the ring-shaped ring member, the ring-shaped ring member sliding relative to the ring-shaped oil seal during rotation of the shaft section.

2. The robot according to claim 1,
wherein the ring-shaped oil seal has a concave section which is formed in a circumferential direction of a ring of the oil seal and is open to the second side arm, and
wherein the opening of the ring-shaped oil seal abuts the second side arm.

3. The robot according to claim 1,
wherein the bearing, the ring-shaped ring member and the oil seal are disposed on an axis oriented orthogonal to the center axis.

4. The robot according to claim 1,
wherein the ring-shaped oil seal has two rip sections formed in an inner periphery section of the ring-shaped oil seal in the circumferential direction of the ring and protrude toward the center axis; and
wherein lubricant is filled in a space enclosed by the inner periphery section of the ring-shaped oil seal, each rip section and the outer periphery section of the ring-shaped ring member.

5. The robot according to claim 1,
wherein the shaft section and the ring-shaped ring member are configured of separated bodies and are configured of materials different from each other.

6. The robot according to claim 5,
wherein the shaft section is configured of a material including iron or aluminum and the ring-shaped ring member is configured of stainless steel.

7. The robot according to claim 1,
wherein curing treatment is applied to the ring-shaped ring member.

8. The robot according to claim 1,
wherein the second side arm has a holding section which holds the bearing between the second side arm and the shaft section.

9. The robot according to claim 1,
wherein the first side arm has a manipulator at the end portion opposite to the second side arm.

10. A robot comprising:
a first side arm and a second side arm connected to each other; and a rotation support mechanism rotatably supporting the first side arm to the second side arm, wherein the rotation support mechanism includes;

a shaft section which is provided in the first side arm and an outer shape of which is a column shape;

a bearing which is disposed on an outer periphery section of the shaft section and rotatably supports the shaft section around a center axis of the shaft section;

a ring-shaped ring member which is provided in the second side arm and is concentrically disposed with the center axis of the bearing in the outer periphery side of the bearing; and a ring-shaped oil seal which is provided in the first side arm and slides with respect to the ring-shaped ring member by abutting the outer periphery section of the ring-shaped ring member during rotation of the shaft section.

11. The robot according to claim 10, wherein the ring-shaped oil seal has a concave section which is formed in a circumferential direction of a ring of the ring-shaped oil seal and is open to the first side arm, and wherein the opening of the oil seal abuts the first side arm.

12. A robot comprising:

a first arm;

a shaft section which is provided in the first arm and an outer shape of which is a column shape;

a bearing rotatably supporting the shaft section;

a ring-shaped first ring member which is concentrically disposed with a center axis of the bearing at an outside from an outer periphery of the bearing;

a ring-shaped second ring member which abuts the first ring member at the outside from an outer periphery of the ring-shaped first ring member; and a second arm connected to the ring-shaped second ring member, wherein the ring-shaped second ring member is connected to the shaft section and slides with respect to the ring-shaped first ring member during rotation of the shaft section.

13. The robot according to claim 12, wherein the ring-shaped second ring member is made of rubber and abuts the ring-shaped first ring member in a compressed state.

14. The robot according to claim 13, wherein the ring-shaped second ring member has an opening section which is open toward the second arm and the opening section abuts the second arm.

15. The robot according to claim 13, wherein the ring-shaped second ring member has an abutting section which abuts the ring-shaped first ring member and a space section which does not abut the ring-shaped first ring member, and lubricant is filled in the space section.

* * * * *